United States Patent [19]

Scozzafava et al.

[11] Patent Number: 4,886,339

[45] Date of Patent: Dec. 12, 1989

[54] OPTICAL ARTICLE CONTAINING A TRANSMISSION MEDIUM EXHIBITING A HIGH LEVEL OF SECOND ORDER POLARIZATION SUSCEPTIBILITY

[75] Inventors: Michael Scozzafava; Donald P. Specht; Abraham Ulman; Craig S. Willand, all of Rochester; David J. Williams, Fairport, all of N.Y.

[73] Assignee: Eastman Kodak Company, Rochester, N.Y.

[21] Appl. No.: 101,897

[22] Filed: Sep. 28, 1987

[51] Int. Cl.$^4$ .............................. G02B 6/00; G02B 1/08
[52] U.S. Cl. ................................ 350/96.34; 350/96.29
[58] Field of Search ........................ 350/96.31, 96.34; 428/441, 411.1; 585/534, 505

[56] References Cited

U.S. PATENT DOCUMENTS

| | | | |
|---|---|---|---|
| 4,431,263 | 2/1984 | Garito | 350/96.34 |
| 4,659,177 | 4/1987 | Choe et al. | 350/96.34 |
| 4,792,208 | 12/1988 | Ulman et al. | 350/96.12 X |
| 4,796,971 | 1/1989 | Robello et al. | 350/96.34 |

OTHER PUBLICATIONS

D. J. Williams, "Organic Polymeric and Non-Polymeric Materials with Large Optical Nonlinearities", *Angew, Chem., Int. Ed. Engl.* 23, (1984), 690–703.

Zyss, "Nonlinear Organic Materials for Integrated Optics", *Journal of Molecular Electronics*, vol. 1, pp. 25–45, 1985.

Singer, Sohn, and Lalama, "Second Harmonic Generation in Poled Polymer Films", *Appl. Phys. Lett.*, vol. 49, No. 5, 8/4/86, pp. 248–250.

D. S. Chemla and J. Zyss, *Nonlinear Optical Properties of Organic Molecules and Crystals*, vol. 1, pp. 280–282.

R. Rheinhardt, R. K. Tiwari, and T. P. Singh, "The Crystal Structure of Sulfisomidine", *Current Science*, vol. 49, p. 586, 1980.

*Primary Examiner*—John D. Lee
*Assistant Examiner*—John Ngo
*Attorney, Agent, or Firm*—Carl O. Thomas

[57] ABSTRACT

An optical article is disclosed containing, for the transmission of electromagnetic radiation, a medium exhibiting a second order polarization susceptibility greater than $10^{-9}$ electrostatic units comprised of polar aligned noncentrosymmetric molecular dipoles having an electron donor moiety linked through a conjugated $\pi$ bonding system to an electron acceptor moiety to permit oscillation of the molecular dipole between a ground state exhibiting a first dipole moment and an excited state exhibiting a differing dipole moment. The molecular dipoles are held in polar alignment by a crosslinked polymeric binder.

25 Claims, 2 Drawing Sheets

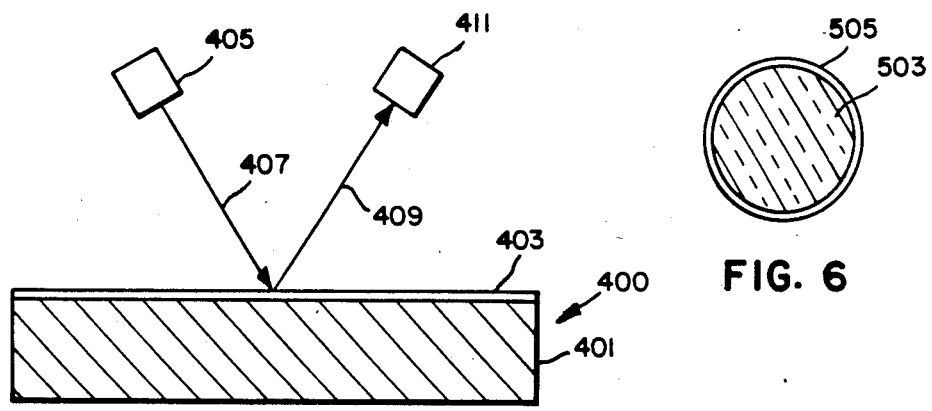
FIG. 4
FIG. 6
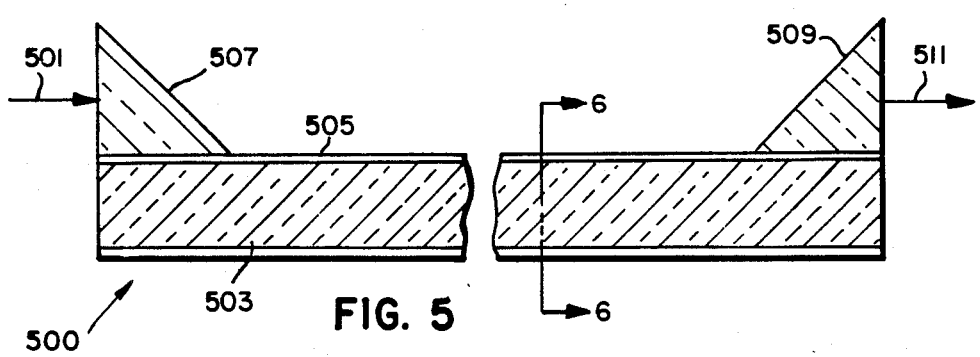
FIG. 5
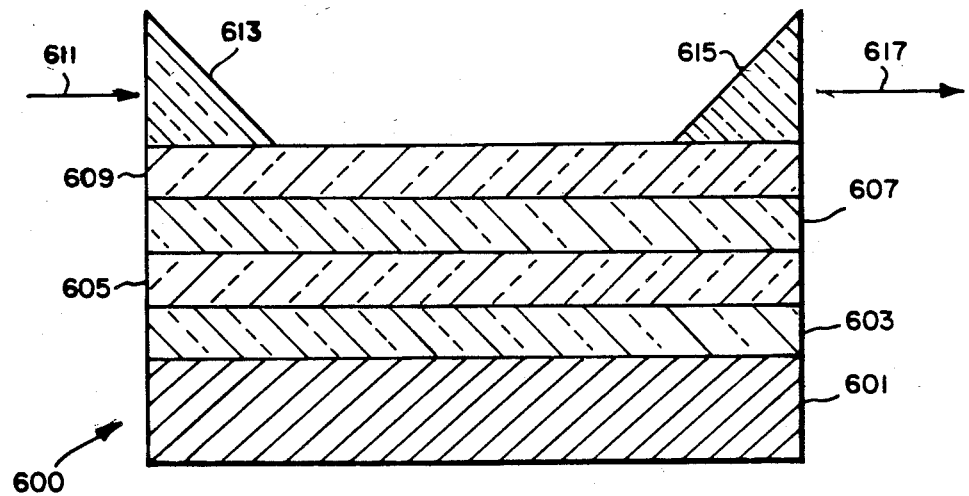
FIG. 7

OPTICAL ARTICLE CONTAINING A TRANSMISSION MEDIUM EXHIBITING A HIGH LEVEL OF SECOND ORDER POLARIZATION SUSCEPTIBILITY

FIELD OF THE INVENTION

The invention relates to optical articles, particularly articles which exhibit effects attributable to the polarization of electromagnetic radiation. The invention relates specifically to optical articles which exhibit effects attributable to the nonlinear polarization of electromagnetic radiation.

BACKGROUND OF THE INVENTION

The significant polarization components of a medium produced by contact with an electric field are first order polarization (linear polarization), second order polarization (first nonlinear polarization), and third order polarization (second nonlinear polarization). On a molecular level this can be expressed by Equation 1:

$$P = \alpha E + \beta E^2 + \gamma E^3 \quad (1)$$

where

P is the total induced polarization,

E is the local electric field created by electromagnetic radiation, and $\alpha$, $\beta$, and $\gamma$ are the first, second, and third order polarizabilities, each of which is a function of molecular properties.

$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 \quad (2)$$

where

P is the total induced polarization,

E is the local electric field created by electromagnetic radiation, and $\chi^{(1)}$, $\chi^{(2)}$, and $\chi^{(3)}$ are the first, second, and third order polarization susceptibilities of the electromagnetic wave transmission medium. $\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi E$, second order or first nonlinear polarization $\chi^{(2)} E^2$, and third order or second nonlinear polarizatin $\chi^{(3)} E^3$.

Second order polarization ($\chi^{(2)} E^2$) has been suggested to be useful for a variety of purposes, including optical rectification (converting electromagnetic radiation input into a DC output), generating an electro-optical (Pockels) effect (using combined electromagnetic radiation and DC inputs to alter during their application the refractive index of the medium), phase alteration of electromagnetic radiation, and parametric effects, most notably frequency doubling, also referred to as second harmonic generation (SHG).

To achieve on a macromolecular level second order polarization ($\chi^{(2)} E^2$) of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu. For a molecule to exhibit values of $\beta$ greater than zero, it is necessary that the molecule be asymmetrical about its center—that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment—e.g., the alignment obtained when molecular dipoles are allowed to align themselves in an electric field.

D. J. Williams, "Organic Polymeric and Non-Polymeric Materials with Large Optical Nonlinearities", *Angew. Chem.* Int. Ed. Engl. 23 (1984) 690–703, postulates mathematically and experimentally corroborates achievement of second order polarization susceptibilities $\chi^{(2)}$ using organic molecular dipoles equalling and exceeding those of conventional inorganic noncentrosymmetric dipole crystals, such a lithium niobate and potassium dihydrogen phosphate. To obtain the polar alignment of the organic molecular dipoles necessary to large values of $\chi^{(2)}$ Williams dispersed small amounts of the organic molecular dipoles as guest molecules in host liquid crystalline polymers. Upon heating the host polymers above their glass transition temperatures, poling in an externally applied electric field to produce the desired polar alignment of the molecular dipoles, and then cooling with the field applied, organic films with the measured levels of $\chi^{(2)}$ were obtained.

In addition Williams notes the fabrication of films with large values of $\chi^{(2)}$ using Langmuir-Blodgett (LB) film construction techniques, such as polydiacetylene chains formed by LB techniques. Williams further suggests the radiation patterning of these films.

Zyss "Nonlinear Organic Materials for Integrated Optics", *Journal of Molecular Electronics,* Vol. 1, pp. 25–45, 1985, though generally cumulative with Williams, provides a review of passive linear light guide construction techniques and elaborates on LB film construction techniques including radiation patterning, showing in FIG. 8 an LB film construction converted into a linear polymer.

Garito U.S. Pat. No. 4,431,263 discloses nonlinear optical, piezoelectric, pyroelectric, waveguide, and other articles containing a linear polymer of a diacetylene.

Singer, Sohn, and Lalama, "Second Harmonic Generation in Poled Polymer Films", *Appl. Phys. Lett.,* Vol. 49, No. 5, 8/4/86, pp. 248–250, discloses placing the azo dye Disperse Red in poly(methyl methacrylate), spin coating on a transparent electrode of indium tin oxide, overcoating with a thin layer of gold, raising the film above its glass transition temperature, applying a poling electric field, and then the film is cooled well below its glass transition temperature with the field applied.

Choe et al U.S. Pat. No. 4,659,177 discloses organic nonlinear optical media containing an organic molecular dipole. Both LB film assembly techniques and dispersal of the organic molecular dipole as a guest in a linear polymer host followed by heating above the glass transition temperature, poling in an electric field, and cooling with the field applied, are disclosed.

RELATED PATENT APPLICATIONS

Optical articles containing a polar aligned organic molecular dipole containing a sulfonyl moiety as an electron acceptor are the specific subject matter of Ulmann et al, "An Optical Article Exhibiting a High Level of Second Order Polarization Susceptibility", Serial No. 101,888, concurrently filed and commonly assigned, now allowed, Pat. No. 4,792,208.

Optical articles containing polar aligned organic molecular dipoles forming repeating units of a crosslinked polymeric matrix are the subject matter of Robello et al, "An Optical Article Containing a Polymeric Matrix Exhibiting a High Level of Second Order Polarization Susceptibility", Serial No. 101,886, concurrently filed and commonly assigned, now allowed, Pat. No. 4,796,971.

Optical articles containing polar aligned organic molecular dipoles as pendant groups of linear polymer repeating units are the subject of Robello et al, "An Optical Article Containing a Linear Polymer Exhibiting a High Level of Second Order Polarization Susceptibility", Serial No. 101,884, concurrently filed and commonly assigned, now abandoned.

SUMMARY OF THE INVENTION

It has been recognized that optical articles containing, for the transmission of electromagnetic radiation, a medium which exhibits a high second order polarization susceptibility provided by molecular dipoles offers the potential for performance advantages over corresponding optical articles employing conventional inorganic noncentrosymmetric dipole crystals, based on superior first hyperpolarizabilities $\beta$, higher transparencies, and greater adaptability of molecular dipoles.

To realize this potential it is necessary to provide a transmission medium in which molecular dipoles are arranged in stable polar alignment. The conventional approach for seeking the desired polar alignment is to dissolve the molecular dipoles in a linear polymer heated above its glass transmission temperature. Applying a DC field while the linear polymer is above its glass transition temperature is relied on for orientation of the molecular dipoles. Cooling the linear polymer below its glass transition temperature with the field still applied is relied upon to hold the molecular dipoles in field induced alignment.

This approach exhibits a variety of disadvantages. One of the most fundamental limitations is that heating increases the random kinetic motion of the molecular dipoles and thereby reduces the polar alignment of the molecular dipoles sought by poling. Another fundamental limitation is that linear polymers, while solid in appearance, are in reality viscous liquids. If the transmission medium is inadvertently reheated to or near its glass transmission temperature after poling, relaxation of whatever alignment has been imparted to the molecular dipoles is dissipated. This is a matter of significant concern, since in many aplications optical articles become internally heated by energy dissipation during the transmission of electromagnetic radiation. Since a linear polymer does not create a rigid matrix, even in the absence of heating relaxation of molecular dipole alignment can occur. Another disadvantage of employing linear polymers is that the molecular dipoles often exhibit lower solubilities in polymeric solvents than in lower molecular weight solvents. This decreases the proportion of the molecular dipole that can be successfully incorporated. Rarely can concentrations of molecular dipoles approaching 20 by weight, based on the weight of the polymer, be obtained.

In one aspect this invention is directed to an optical article containing, for the transmission of electromagnetic radiation, a medium exhibiting a second order polarization susceptibility greater than $10^{-9}$ electrostatic units comprised of polar aligned noncentrosymmetric moleculr dipoles having an electron donor moiety linked through a conjugated $\pi$ bonding system to an electron acceptor moiety to permit oscillation of the molecular dipole between a ground state exhibiting a first dipoles moment and an excited state exhibiting a differing dipole moment. The molecular dipoles are characterized in that the molecular dipoles are held in polar alignment by a crosslinked polymeric binder.

BRIEF DESCRIPTION OF THE DRAWINGS

FIG. 4 is an alternative form of a second harmonic generating optical artical.

FIG. 5 is an optical article for achieving parametric effects.

FIG. 6 is a section taken along section line 6—6 in FIG. 5.

FIG. 7 is an optical article for achieving parametric effects and phase shifting.

DESCRIPTION OF PREFERRED EMBODIMENTS

Figure 1:
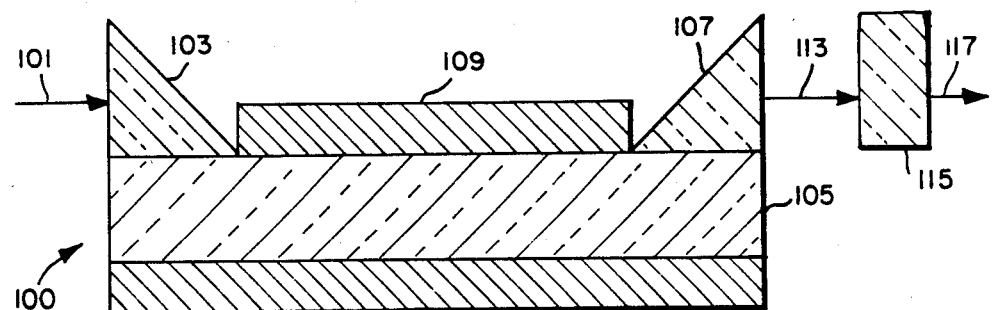
FIG. 1 is a second harmonic generating optical article.

The following are illustrative of optical articles satisfying the invention exhibiting effects attributable to second order polarization:

Referring to FIG. 1, the optical article 100 is capable of generating a second harmonic of electromagnetic radiation 101 supplied to it. Incoming electromagnetic radiation is introduced through input means 103, shown as a first prism, into an otpically active transmission medium 105 which exhibits a high level ($>10^{-9}$ esu) second order or first nonlinear polarization susceptibility, hereinafter referred to simply as the optically active transmission medium according to the invention or, more succinctly, as the optically active transmission medium. Electromagnetic radiation is transmitted through the medium 105 to output means 107, shown as a second prism. In the simplest form of the optical article neither the input nor output prisms are required. Escape of electromagnetic radiation from the transmission medium can be minimized by locating optional guiding elements 109 and 111 above and below the transmission medium. The guiding elements can minimize radiation loss by being chosen to exhibit a lower refractive index than the transmission medium. Additionally or alternatively, the guiding elements can be chosen to be reflective to the electromagnetic radiation.

When the transmission medium is constructed according to the requirements of the invention, specifically described below, at least a portion of the electromagnetic radiation entering the transmission medium will be alterred in frequency during its travel through the medium. More specifically, a second harmonic of the frequency will be generated. The electromagnetic radiation leaving the output means, indicated by arrow 113, exhibits both the original frequency of the input radiation and a second harmonic of this frequency. The electromagnetic radiation retaining the original frequency can, if desired, be removed by passing the electromagnetic radiation leaving the article through a filter 115 capable of absorbing radiation of the original frequency while transmitting higher frequency (shorter wavelength) portions of the electromagnetic radiation. By employing one or a combination of filters any broad or narrow frequency band of electromagnetic radiation can be retained in the transmitted output electromagnetic radiation 117.

Figure 2:
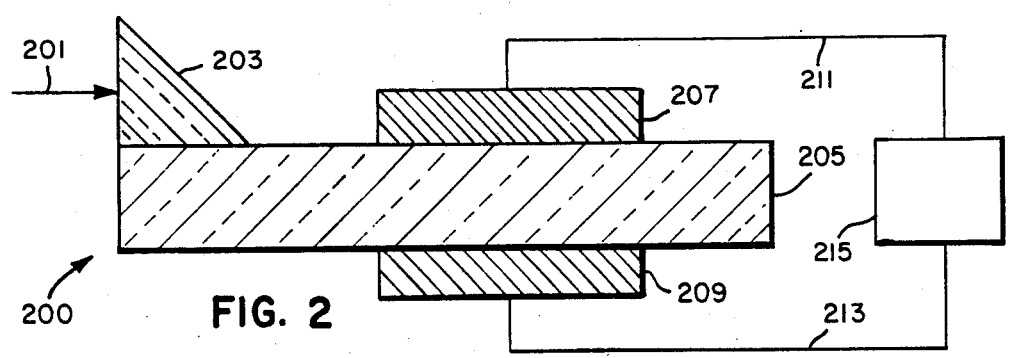
FIG. 2 is a DC signal providing optical article.

Referring to FIG. 2, an optical article 200 is shown capable of producing a DC potential when electromagnetic radiation 201 is suppled through input means 203, shown as a prism, to optically active transmission medium 205, which can be identical to medium 105, described above. When electromagnetic radiation is being transmitted through the medium a potential difference is produced between upper electrode 207 and lower electrode 209 in electrical contact with the upper and lower surfaces of the transmission medium. Electrical conductors 211 and 213 can be used to relay the potential of the upper and lower electrodes to an electronic response unit 215. The electronic response unit can in its simplest form be a unit that provides a digital response indicative of the the presence or absence of electromagnetic radiation in the transmission medium. Alternatively, the electronic response unit can provide an analog response indicative not only of the presence, but also the intensity or wavelength of electromagnetic radiation in the transmission medium.

Figure 3:
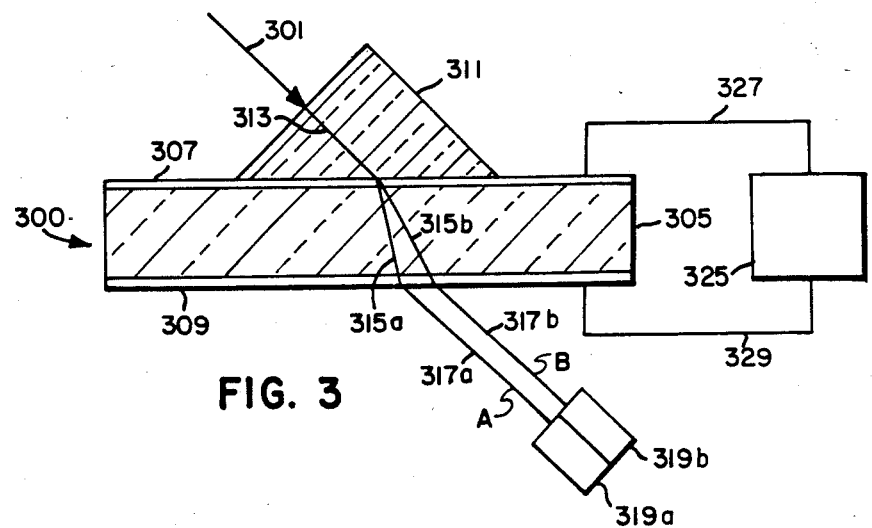
FIG. 3 is an electromagnetic beam displacement optical article.

Referring to FIG. 3, the optical article 300 is capable of physically displacing a beam 301 of electromagnetic radiation being transmitted through it as a function of the concurrent receipt of a DC bias. Optically active transmission medium 305, which can be identical to optically active medium 105 or 205, is provided with transparent upper and lower electrodes 307 and 309. The electrodes can, for example, be thin layers of a vacuum vapor deposited metal or metal oxide—e.g., indium tin oxide. An electromagnetic radiation input means, shown as prism 311, is located on the upper transparent electrode. The electromagnetic radiation passes through the prism as indicated by arrow 313. When the electromagnetic radiation enters the transmission medium, it follows either path 315a or path 315b. Depending upon which of the two alternative paths are followed, the first electromagnetic radiation either travels along path 317a or 317b upon emerging from the lower transparent electrode. The paths 315a and 317a together constitute an A path through the optical article while the paths 315b and 317b together constitute a B path through the optical article. Sensing units 319a and 319b are located to receive electromagnetic radiation traveling along the A and B paths, respectively. It is apparent that only one of the two sensing units is essential, since failure to sense electromagnetic radiation can be employed to indicate that the electromagnetic radiation has shifted to the alternate path.

Shifting of electromagnetic radiation between the A and B paths is achieved by supplying a DC bias to the upper and lower electrodes while transmission of the electromagnetic radiation through the optically active transmission medium is occurring. To accomplish the required DC bias a DC potential source 325 is shown connected to the upper and lower electrodes by electrical conductors 327 and 329.

Application of the DC bias alters the refractive index of the transmission medium when it is formed of a material exhibiting a significant second order susceptibility. This causes the first electromagnetic radiation beam to be refracted at a different angle when the transmission medium is electrically biased, and this changes the first electromagnetic radiation path through the transmission medium. In some instances the refractive index of the transmission medium is increased by the electrical bias and in other instances lowered by the electrical bias, depending upon whether the molecular dipole contained within the transmission medium exhibits a positive or negative first hyperpolarizability $\beta$.

In FIG. 4 an optical article 400 is shown comprised of a reflective substrate 401 and an 5ptically active transmission medium 403 according to the invention shown in the form of a layer. Electromagnetic radiation is supplied from a source 405 as indicated by arrow 407. The electromagnetic radiation traverses the optically active transmission medium, is reflected by the substrate, and traverses the optically active transmission medium a second time. Electromagnetic radiation leaving the optically active transmission medium is indicated by arrow 409. A sensor 411 which is responsive to the second harmonic of the input electromagnetic radiation, but not radiation at the wavelength of the input radiation, is shown provided to receive electromagnetic radiation from the layer 403. Instead of employing a sensor that is selectively responsive to the second harmonic wavelength, a sensor with a broader frequency band of response can be employed in combination with one or more filter elements, as described above in connection with FIG. 1. The thinner the layer of the optically active transmission medium, the higher the intensity of the input electromagnetic radiation must be in order to achieve a given output of second harmonic radiation. In the limiting case the optically active transmission medium can be a monomolecular oriented molecular dipole layer.

In FIGS. 5 and 6 an optical article 500 according to the invention is shown capable of inducing parametric effects, such as second harmonic generation, by acting on input electromagnetic radiation, indicated by arrow 501. To achieve alteration of the input radiation a transparent optical waveguide 503 of any conventional type is provided having on its external surface a layer of an optically active transmission medium 505 according to the invention, which can have the same properties as the medium 105, described above. The optical waveguide 503 is normally optically passive—that is, exhibits no significant levels of nonlinear (second or third order) polarization.

Means 507, shown as a prism, is provided to introduce the input electromagnetic radiation into the waveguide. Means 509, shown as a prism, is provided to retrieve electromagnetic radiation from the waveguide. Although the optically active transmission medium is shown interposed between the input and output prisms, it is appreciated that an interposed layer is not required in these locations.

As the input electromagnetic radiation traverses the waveguide, a portion of the radiation will impinge on the surrounding layer of the optically active transmission medium and be refracted back into the waveguide. To avoid escape of electromagnetic radiation a reflective layer, not shown, can be coated over the optically active transmission medium. Successive impingements of transmitted radiation on the optically active medium result in measureable parametric effects, such as second harmonic generation.

In FIG. 7 an optical article 600 is shown capable of producing useful parametric effects similarly as optical article 500, but exhibiting a greater capability for better phase matching, such as that desired for improved efficiency second harmonic generation. A substrate 601 is shown supporting superimposed waveguide layers 603, 605, 607, and 609. While four superimposed layers are shown, in practice any odd or even number of superimposed layers can be provided. The odd layers (603 and 607) in the sequence can be formed of an optically active transmission medium according to the invention (similarly as medium 105) while the even layers (605 and 609) can be formed of a passive or linear optical medium, as described above. Alternatively, the optically active and passive transmission media layers can be reversed in order.

To achieve useful parametric effects, electromagnetic radiation, indicated by arrow 611 is supplied to the waveguiding layers through input means 613, shown as a prism. In passing through the waveguiding layers to output means 615, shown as a prism, the optically active and passive media layers together alter the form of the electromagnetic radiation, indicated by output arrow 617, so that parametric (e.g., second harmonic) effects are more efficiently generated.

The optical article constructions described above are exemplary of a large variety of possible differing optical article constructions. The present invention is compatible with any conventional construction of an optical article relying on a significant second order polarization susceptibility to produce a useful effect. For example, whereas in connection with FIG. 5 an optical article is disclosed in which the optically active transmission medium surrounds a substrate, which can have linear optical properties, Zyss, cited above, in FIG. 2(d) discloses just the converse arrangement, in which the optically active transmission medium forms a core clad with a shell of a linear optical transmission medium. Zyss also discloses an arrangement in which the optically active transmission medium is located in a groove on the surface of a linear optical transmission substrate. All of the optical article constructions of Zyss exhibiting second order nonpolarizaiton effects can be applied to the practice of this invention and are here incorporated by reference.

An essential component of each of the optical articles of this invention is an optically active transmission medium exhibiting a second order polarization susceptibility greater than $10^{-9}$ (preferably greater than $10^{-8}$) electrostatic units containing polar aligned molecular dipoles in a crosslinked polymeric binder.

The molecular dipoles can take any of a wide variety of conventional forms. For example, the molcular dipoles disclosed by D. J. Williams, "Organic Polymeric and Non-Polymeric Materials with Large Optical Nonlinearities", *Angew. Chem.* Inc. Ed. Engl. 23 (1984) 690–703; Zyss "Nonlinear Organic Materials for Integrated Optics", *Journal of Molecular Electronics*, Vol. 1, pp. 25–45, 1985; Choe U.S. Pat. No. 4,605,869; Girling, Cade, Kolinsky, and Montgomery, "Observation of Second Harmonic Generation from a Langmuir-Blodgett Monolayer of a Merocyanine Dye," *Electonics Letters*, Vol. 21, No. 5, 2/28/85; Neal, Petty, Roberts, Ahmad, and Feast. "Second Harmonic Generation from LB Superlattices Containing two Active Components," *Electronics Letters*, Vol. 22, No. 9, 4/24/86; Singer, Sohn and Lalama, "Second Harmonic Generation in Poled Polymer Films", *Appl. Phys. Lett.*, Vol. 49, No. 5, 8/4/86, pp. 248–250; and Choe et al U.S. Pat. No. 4,659,177, the disclosures of which are here incorporated by reference.

The preferred molecular dipoles are noncentrosymmetric compounds comprised of an electron acceptor moiety bonded to an electron donor moiety by a linking moiety providing a conjugated $\pi$ bonding system to permit oscillation of the molecular dipole between a ground state exhibiting a first dipole moment and an excited state exhibiting a differing dipole moment. The molecular dipoles are represented in formula pairs by the oscillation (resonance) ground state and excited state extremes, since these lend themselves to representation by chemical formulae. Formula pairs are useful in bracketing the range of structural variance, even though it is recognized that in practice neither of the oscillation extremes may be actually fully realized. The preferred molecular dipoles incorporated in the optical articles of this invention are generally represented by Formula Pair 3.

where
A is an electron acceptor moiety;
D is an electron donor moiety; and
E is a linking moiety, specifically a conjugated $\pi$ bonding system, which provides a pathway for charge transfer resonance.

For convenience the molecular dipoles are named using their ground state structures, unless otherwise noted.

The electron acceptor moiety A can take any convenient conventional form. For example, the electron acceptor moiety can be an oxo, cyano, or nitro moiety, as disclosed by Williams, cited above. In a specifically preferred form of the invention the electron acceptor moiety A is a sulfonyl moiety. Optical articles containing a polar aligned organic molecular dipole containing a sulfonyl moiety as an electron acceptor are the specific subject matter of Ulman et al, "An Optical Article Exhibiting a High Level of Second Order Susceptibility", Serial No. 101,888, concurrently filed and commonly assigned now allowed, Pat. No. 4,792,208. When the electron acceptor moiety is a sulfonyl moiety, it can be represented by Formula Pair 4.

where R is an optionally substituted hydrocarbon moiety.

The electron donor moieties can take any convenient conventional form. The electron donor moiety can be an amino moiety. Primary, secondary, and tertiary amino moieties are contemplated for use, with the latter being most preferred and the former being least preferred. Only the secondary and tertiary amino moieties allow for substituent modification of properties through optional substitution of a hydrocarbon moiety similarly as the sulfonyl moiety, and only the tertiary amino moiety produces the most highly polar excited state. When the electron donor is an amino moiety moiety, it can be represented by Formula Pair 5.

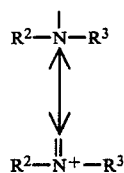

$$\begin{array}{c} | \\ R^2-N-R^3 \\ \updownarrow \\ \overset{\|}{R^2-N^+-R^3} \end{array} \qquad (5)$$

where $R^2$ $R^3$ are independently hydrogen or optionally substituted hydrocarbon moieties.

Instead of employing an amino group as an electron donor moiety, it is specifically contemplated to employ an oxy or thio electron donor moiety. When such oxy and thio electron donor moieties can be represented by Formula Pair 6.

where
$R^4$ is an optionally substituted hydrocarbon moiety and X is oxygen or sulfur.

The moiety E linking the electron acceptor and donor moieties is selected to satisfy three fundamental characteristics. First, it is chosen so that the molecule will be noncentrosymmetric, thereby exhibiting a dipole moment even in its ground state. Second, it is chosen to provide sufficient spatial separation of the electron donor and acceptor moieties to provide a large dipole moment in the polar excited state of the electron donor and acceptor moieties. Third, the linking moiety is chosen to permit efficient oscillation or charge transfer resonance between the ground and excited states. This results in large differences between the excited state and ground state dipole moments.

A conjugated $\pi$ bonding system can satisfy all three requirements. On its most elemental level such a bonding system can be provided by chains of methine (a.k.a., methenyl and methylidyne) groups, which are (except as specifically noted) to be understood as including substituted forms. Such chains can optionally include one or more aza (—N=) moieties.

To satisfy the requirement for oscillation or charge transfer resonance, it is essential that the resonance path be defined by an even number of atoms. The number of atoms in the resonance path between the electron donor and acceptor is preferably at least 4 and optimally at least 8.

While increasing the number of atoms in the resonance path should increase the excited state dipole moment, it also tends toward nonplanar molecular conformations which lead to losses in hyperpolarizability density, defined above, as well as thermal and other energy losses (e.g., losses in transparency), so that at first diminishing gains and then overall losses result from increasing the number of atoms in the resonance path. It is generally preferred that the number of atoms in the resonance path between the electron donor and acceptor be 20 or less and optimally 14 or less.

In a preferred form the linking moieties can be represented by Formula Pair 7.

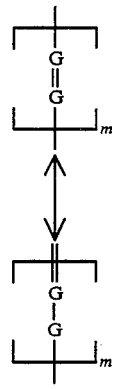

(7)

where
G is independently in each occurrence methine or aza and
m is 4 to 20, preferably 8 to 14.

For synthetic convenience it is generally preferred that no more than two adjacent G groups be aza groups. Thus, both individual aza (—N=) and diazo (—N=N—) groups are contemplated to be present in the linking moiety.

While the aza groups permit no substitution, the methine groups can be substituted, if desired. Preferred linking moieties are those which have been at least partially rigidized by substituents bridging methine groups in the resonance path. Rigidization of the linking moiety reduces energy dissipation. In a specifically preferred form of bridging substitution of the methine groups in the resonance path, the linking moiety is wholly or, preferably, partially aromatized. Both carbocyclic and heterocyclic aromatization is specifically contemplated.

In a specific preferred form of the invention the electron acceptor moiety A and the adjacent terminal portion of the linking moiety E can be represented by Formula Pair 8.

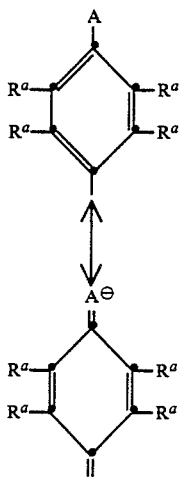

(8)

where
A is an electron acceptor moiety and $R^a$ represent hydrogen, substituents which together with the electron acceptor moiety collectively enhance the electron acceptance of the phenyl ring to which they are attached.

When the electron acceptor moiety is a sulfonyl moiety $SO_2R^1$ and the adjacent atom of the linking moiety is an aza (—N=) group, the sulfonyl and aza groups in combination form a sulfonimino group $=N-SO_2R^1$. In a specific preferred form of the invention the terminal sulfonimino group and an adjacent aromatized portion of the linking group can be represented by Formula Pair 9.

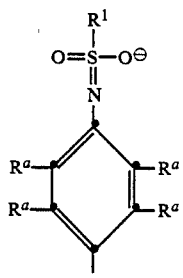

(9)

where $R^a$ and $R^1$ are as previously defined.

In a specific preferred form of the invention the electron donor moiety D and the adjacent terminal portion of the linking moiety E can be represented by Formula Pair 10.

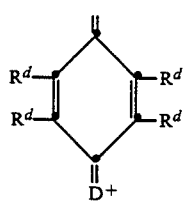

(10)

where
D is an electron donor moiety and $R^d$ represent hydrogen, substituents which together with the electron donor D collectively enhance the electron donation of the phenyl ring to which they are attached.

When electron donation is from a nitrogen atom, a terminal aromatic rigidizing ring system formed by a 4-pyridinium and 4-pyrido tautomer is possible, as illustrated by the preferred dipolar compounds of Formula Pair 11.

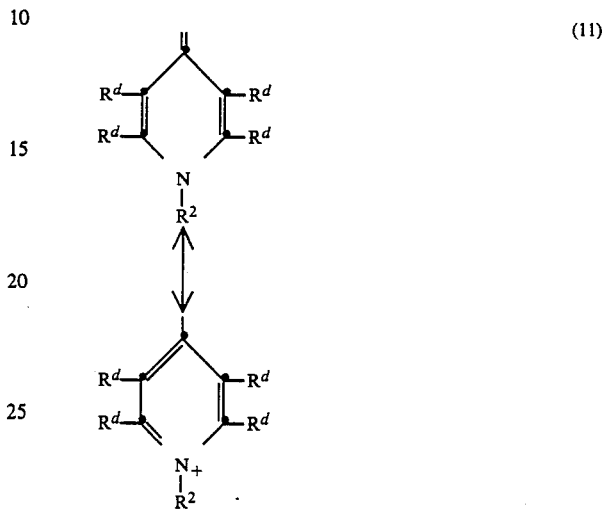

(11)

where $R^d$ and $R^2$ are as previously defined.

In specifically preferred forms of the molecular dipoles the linking moiety is aromatized adjacent both the electron acceptor moiety, as indicated by Formulae 8 and 9, and the electron donor moiety, as indicated by Formulae 10 and 11.

A specifically preferred class of molecular dipoles satisfying the requirements of the invention are 4A-4'-D-stilbenes, where A and D are as previously defined. In these stilbenes the electron acceptor and donor moieties are each bonded to one terminal aromatized portion of the conjugated π bonding linking moiety, with the aromatized portions of the linking moiety being joined by an ethylene (vinylene) group. When the single ethylene linking group of the stilbene s replaced by two or more ethylene groups, within the resonance path chain length limits noted above, highly advantageous analogues are realized. Substitution of individual methine groups with aza groups, particularly in the ethylenic portion of the linkage, are compatible with achieving high β values. The ethylenically expanded and aza subsituted stilbene variants are hereinafter referred to as stilbenoid compounds, since they are compounds which share significant property similarities with stilbenes.

In a preferred form of the invention, the stilbenes and stilbenoid compounds can be presented by Formula Pair 12:

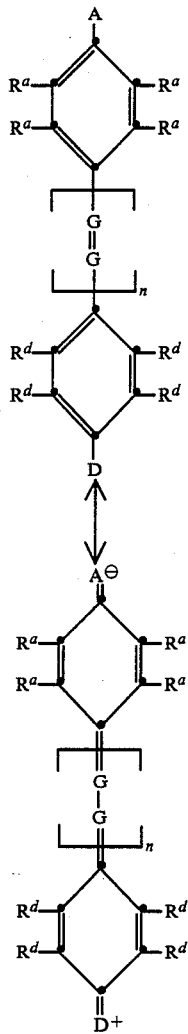

(12)

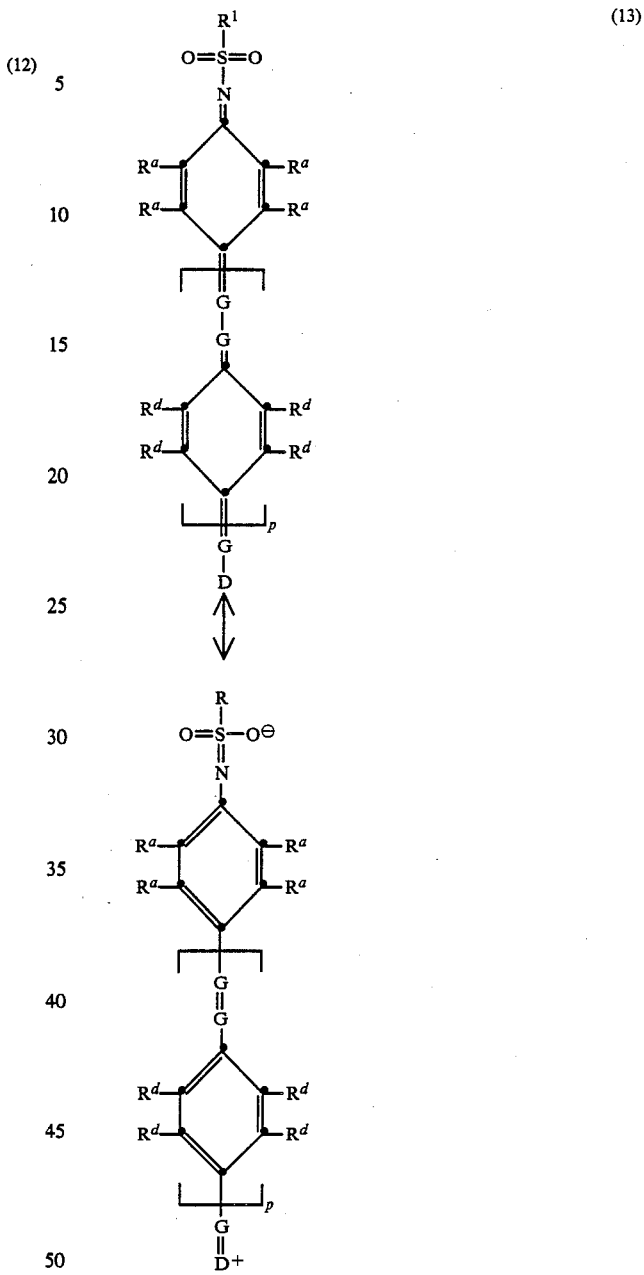

(13)

where

A, D, $R^a$, and $R^d$ are as previously defined;

D is an electron donor moiety;

G is independently in each occurrence a methine or aza moiety, with the proviso that no more than two aza moieties are next adjacent; and n is an integer of from 1 to 3.

A sulfonimino group is incompatible with the stilbenoid structures of Formula Pair 12. One preferred class of dipolar compounds exhibiting high levels of hyperpolarizability incorporating a terminal sulfonimino group are represented by Formula Pair 13.

where

D, $R^1$, $R^1$, and $R^d$ are as previously defined;

G is independently in each occurrence a methine or aza moiety, with the proviso that no more than two aza moieties are next adjacent; and p is 0 or 1.

In Formula Pair 13 neither of the two terminal resonance path atoms of the linking moiety are included in rigidizing aromatic ring, but the rigidizing aromatic ring or rings are located next adjacent to each resonance path terminal atom of the linking moiety. Note that either 6 or 12 atoms are present in the resonance path provided by the linking moiety.

When electron donation is from a nitrogen atom, a terminal aromatic rigidizing ring system formed by a 4-pyridinium and 4-pyrido tautomer is possible, as illustrated by the preferred dipolar compounds of Formula Pair 14.

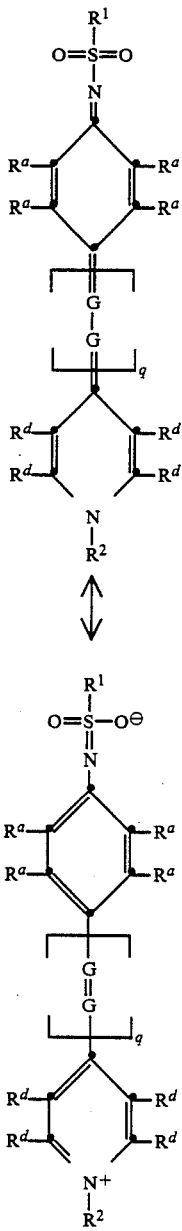

(14)

where

R$^1$, R$^2$, R$^a$, and R$^d$ are as previously defined;

G is independently in each occurrence a methine or a aza moiety, with the proviso that no more than two aza moieties are next adjacent; and q is an integer of from 0 to 3.

When the linking moiety contains two or more aromatic rings, it is specifically preferred that they be coplanar, since coplanarity achieves the highest hyperpolarizability densities. To preserve the coplanarity of the rings it is preferred that any intermediate methine groups which are not part of an aromatic ring remain unsubstituted. However, sterically compact methine substituents compatible with copolanarity, such as fluorine and lower alkyl groups of from about 1 to 3 carbon atoms, are contemplated.

The aromatic rings of the linking moiety can be left unsubstituted while achieving high levels of performance. In other instances it may be synthetically convenient to employ the aromatic rings of the linking moiety as sites for crosslinking the molecular dipoles. In either instance, it is appreciated that the dipole moment of a molecular dipole can be increased by employing in available phenylene ring positions substituents which supplement the electronic asymmetry induced by the electron acceptor A moiety and the electron donor moiety D. Electron donating and accepting properties of phenyl rings imparted by substitution have been extensively studied and quantified by the assignment of Hammett sigma values while negative Hammett sigma values are assigned to substituents which render phenyl rings electron donating. Hydrogen atoms attached to phenyl rings assigned a Hammett sigma value of zero. By algebraically summing the Hammett sigma values of substituents to a phenyl ring it is possible to arrive at a net Hammett sigma value for the phenyl ring that is indicative of whether the substituted phenyl ring is electron accepting (indicated by a positive net Hammett sigma value) or electron donating (indicated by a negative net Hammett sigma value). Further, the algebraic sum of the substituent Hammett sigma values quantifies the degree to which the substituted phenyl ring is electron accepting or donating.

Lange's Handbook of Chemistry, 12 Ed., McGraw-Hill, 1979, Table 3-12, pp. 3-135 to 3-138 here incorporated by reference, lists Hammett sigma values for a large number of commmonly encountered substituents. Ortho and para position substituents usually exhibit identical Hammett sigma values, which differ to only a limited degree from meta sigma values and can, in any event, be determined from published lists. Exemplary simple substituents and their published meta Hammett sigma values are primary and second alkyl substituents, such as methyl $\sigma=-0.07$, ethyl $\sigma=-0.07$, n-propyl $\sigma=-0.05$, i-propyl $\sigma=-0.07$, n-butyl $\sigma=-0.07$, and sec-butyl $\sigma=-0.07$. These alkyl substituents are synthetically convenient and therefore contemplated. Alkyl substituents containing tertiary carbon atoms and particularly tertiary alkyl groups tend to be even more highly electron donating. Aryl groups such as phenyl, α-naphthyl, and β-naphthyl groups are contemplated (e.g., phenyl $\sigma=+0.06$). Other useful and specifically contemplated hydrocarbons substituents include alkaryl substituents (e.g., p-methylphenyl), aralkyl substituents (e.g., benzyl $\sigma=-0.05$ and phenethyl), alkenyl substituents (e.g. vinyl $\sigma=+0.02$), aralkenyl substituents (e.g., 2-phenylvinyl $\sigma=+0.14$), alkynyl substituents (e.g., ethynyl $\sigma=+0.21$, propargyl, and 2-butynyl), and aralkynyl substituents (e.g., phenethynyl $\sigma=+0.14$). Substituted hydrocarbon substituents are also contemplated, such as haloalkyl substituents (e.g., bromomethyl, chloromethyl $\sigma=-0.12$, fluromethyl, and iodomethyl), haloaryl substituents (e.g., p-bromophenyl, m-bromophenyl, and p-chlorophenyl, and hydroxyalkyl substituents (e.g., hydroxymethyl $\sigma=+0.08$).

It is specifically preferred to select R$^a$ substituents independently from among known phenyl ring substituents having a positive Hammett sigma value and to select R$^d$ substituents independently from among known phenyl ring substituents having a negative Hammett sigma value. However, it is recognized that combinations of R$^a$ substituents are possible, some of which are electron donating, some of which are essentially neutral, and some of which are electron accepting.

Combinations of $R^a$ substituents are possible which, together with the electron acceptor moiety A, algebraically sum to a positive net Hammett sigma value. Preferably the combination of $R^a$ substituents, without inclusion of the sulfonyl group, provide a positive net Hammett sigma value. Similarly, any combination of $R^d$ substituents is possible which, together with the electron donor, D, algebraically sum to a negative net Hammett sigma value. Preferably the combination of $R^d$ substituents, without inclusion of the substituent D, provide a negative net Hammett sigma value.

To avoid perturbation of the desired resonance pattern no one $R^a$ substituent should have a Hammett sigma value more positive than that of the electron acceptor moiety, and no one $R^d$ substitutent should have a Hammett sigma value more negative than that of the electron donor moiety D. It is also important to bear in mind that large $\beta$ values depend not only on achieving a large dipole moment, but also on achieving a large difference between the excited state and ground state dipole moments. Thus substituents must be chosen from among those which are compatible with reversible charge transfer—i.e., charge transfer resonance. Thus substituents of the very highest and lowest Hammett sigma values are preferably avoided.

It is recognized that two adjacent $R^a$ or $R^d$ substitutents can, if desired, together form a ring fused with the phenyl ring to which they are attached. Fused benzo rings are specifically contemplated. Polycyclic aromatic rings, such as naphthyl and anthracyl aromatic rings, in the linking moieties are therefore possible. Fused benzo rings are compatible with the coplanarity of the aromatic nuclei and, unless they are themselves substituted, have little effect on electronic asymmetry. It is further recognized that $R^2$, $R^3$, and $R^4$ can, if desired, form with an $R^d$ substituent ortho to D a fused ring, preferably of 5 or 6 member ring. For example, the amino electron donor moiety in Formula Pair 11 can form with the linking moiety a julolidene ring. Numerous other fused rings containing the heteroatom of the electron donor moiety are possible. However, while within the contemplation of useful dipole molecular structures, fused ring substituent patterns are not generally preferred, since they increase molecular bulk, thereby reducing the hyperpolarizability density, while lacking in many instances the synthetic convenience of monovalent substituents.

The substituents $R^1$ and $R^4$ are optionally substituted hydrocarbon substituents in all instances, while the substitutents $R^2$ and $R^3$ can be hydrogen or optionally substituted hydrocarbon substituents, with one or both most preferably being optionally substituted hydrocarbon substituents. Specifically contemplated forms of hydrocarbon substituents are aliphatic hydrocarbon substituents containing from 1 to about 40 (preferably 1 to 10 carbon atoms and optimally 1 to 6) carbon atoms—e.g., alkyl, alkenyl, and alkynyl, including all cyclic forms thereof; aromatic hydrocarbon substituents containing from 6 to 20 carbon atoms (preferably 6 to 10 carbon atoms—i.e., phenyl and naphthyl); and hydrocarbon substituents which are composites of these aliphatic and aromatic substituents—e.g., alkaryl, aralkyl, alkaralkyl, aralkaryl, etc. The aliphatic substituents and substituent moieties can contain unsaturation for steric or synthetic convenience. All of the hydrocarbon substituents can, optionally, themselves be substituted to facilitate polar alignment in the transmission medium.

The hydrocarbon and substituted hydrocarbon substituents of the electron acceptor and donor moieties can be chosen, if desired, to enhance the electron accepting or donating functions of the electron acceptor and donor moieties, respectively. Hammett sigma values of the electron donor and electron acceptor moieties are useful for this purpose, as explained above in connection with the selection of $R^a$ and $R^d$ substituents. For example, the Hammett sigma values of a primary amino group ($-NH_2$); second amino groups, such as alkylamino (e.g., $-NHCH_3$, $-NHCH_2CH_3$, and $-NH-n-C_4H_9$); and tertiary amino groups, such as dialkylamino (e.g., dimethylamino) range from $-0.04$ for the primary amino group to $-0.83$, with the secondary and tertiary amino groups generally having Hammett sigma values more negative than $-0.20$.

The molecular dipoles are held in polar alignment in a crosslinked polymeric binder to form the optically active transmission medium. The molecular dipoles are dissolved in a fluid precursor of the binder, such as a monomer or oligomer capable of polymerizing to form a crosslinked polymer or a linear polymer capable of crosslinking to form a crosslinked binder. The molecular dipoles are aligned (poled) in an externally applied DC electric field, and crosslinking is undertaken with the field still applied.

It is an advantage of the invention that it not necessary at any time to heat the materials above ambient temperatures, although mild heating is not incompatible with the invention. It is further important to note that the linear polymers employed as binder precursors are to be distinguished from the linear polymers previously employed as binders in the art. Whereas the prior art linear polymer binders must be so highly viscous as to be apparently solid at room temperatures, the linear polymers employed in the practice of this invention as binder precursors can be and preferably are relatively low viscosity liquids at room temperatures. In addition to avoiding any necessity of heating prior to or during poling, the lower molecular weight linear polymers are capable of dissolving higher proportions of the molecular dipoles than are the relatively higher molecular weight linear polymer binders of the prior art.

While any convenient technique can be employed for converting the binder precursor into a crosslinked binder, photocrosslinking is preferred. As employed herein the term "photocrosslinking" is employed to designate a reaction stimulated by exposure to electromagnetic radiation that either converts photosensitive monomers into crosslinked polymers or crosslinks linear photosensitive polymers. Useful photosensitive binder precursors capable of producing crosslinked polymeric binders can be chosen from among those employed in conventional negative working photoresist compositions.

Diazo resins are photosensitive linear polymers specifically contemplated for use as binder precursors. Many water soluble radiation sensitive diazo resins are useful. Particularly contemplated are low molecular weight diazo resins which are acid condensation products of a diazonium salt of p-aminodiphenylamine, such as diphenylamine-4-diazonium halide or diphenylamine-4-diazonium phosphate, condensed in acid with aldehydes such as paraformaldehyde or formaldehyde and converted to a double metal salt, such as chlorozincate or fluoroborate. These resins are well known in the art and are described, for example, by Kosar, *Light Sensitive Systems*, pp. 323–324, John Wiley and Sons, NY, NY (1965). One particularly suitable diazo resin composition is the composition described in "Continuous-Toned Dyed Diazo Imaging Elements", Research Disclosure, Vol. 169, Item 16976, May 1978, here incorporated by reference.

In one preferred form of the invention the binder precursor is a monomer, oligomer, or linear polymer containing containing ethylenic unsaturation that is photostimulated to undergo a crosslinking or hardening reaction. For example, any of the monomeric or crosslinkable polymeric film forming components disclosed in Jenkins et al and Heseltine et al U.S. Reissue 27,925 or 27,922, respectively, are suitable for use in forming the crosslinked polymeric binders employed in the practice of this invention. Tan et al U.S. Pat. No. 4,289,842, here incorporated by reference, discloses negative working hardenable imaging compositions containing light sensitive acrylate copolymers containing pendant groups, such as alkenyl groups with ethylenic unsaturation. Lindley U.S. Pat. No. 4,590,147, here incorporated by reference, discloses vinyl oligomers which can be employed as film forming components in the hardenable imaging compositions of this invention. Useful film forming components containing vinyl monomers are disclosed in Fuerniss U.S. Pat. No. 4,497,889 and Anderson et al U.S. Pat. No. 4,535,052, both here incorporated by reference. Kosar Light Sensitive Systems, John Wiley & Sons, 1965, further describes a variety of useful film forming components for use in the practice of this invention, including ethylenically unsaturated monomers and polymers.

Because of their superior properties, including exceptionally high levels of optical transparency within the visible portion of the spectrum and ease of handling and polymerizing, preferred binder precursors are $\alpha,\beta$-ethylenically unsaturated monomers. Useful $\alpha,\beta$-ethenically unsaturated monomers are derived from:

1. polyfunctional aromatic or aliphatic acids such as 1,3,5-benzenetricarboxylic acid, 1,4-benzenedicarboxylic acid, 1,3-benzenedicarboxylic acid, 1,3-naphthalenecarboxylic acid, 1,2,4-benzenetricarboxylic acid, 1,2-benzenedicarboxylic acid, 1,2,3-benzenetricarboxylic acid, 1,2,4,5-benzenetetracarboxylic acid, 1,2,3,5-benzenetetracarboxylic acid, 1,4-cyclohexanedicarboxylic acid, 1,3-cyclohexanedicarboxylic acid, 1,3,5-cyclohexanetricarboxylic acid, 1,2-cyclohexanedicarboxylic acid, 1,2,4-cyclohexanetricarboxylic acid, 1,2,3-cyclohexanetricarboxylic acid, 1,2,4,5-cyclohexanetetracarboxylic acid, 1,2,3,5-cyclohexanetetracarboxylic acid, 1,2,4,5-cyclohexanetetracarboxylic acid and their derivatives.

2. polyfunctional aromatic or aliphatic alcohols such as 1,2,3-benzenetriol, 1,2,4-benzenetriol, 1,3,5-benzenetriol, 1,2-benzenediol, 1,3-benzenediol, 1,4-benzenediol, 1,2,3-cyclohexanetriol, 1,2,4-cyclohexanetriol, 1,3,5-cyclohexanetriol, 1,2-cyclohexanediol, 1,4-cyclohexanediol.

3. polyfunctional polynuclear aromatic or aliphatic alcohols such as hydrogenated bisphenol A, bisphenols with long chain bridges such as butylene, heptylene, hexylene, octadecylene and the like.

4. polyfunctional polynuclear aromatic or aliphatic acids such as phenylindanedicarboxylic acid, hydrogenated phenylindanedicarboxylic acid, 4,4'-isopropylidenedibenzoic acid, 4,4'-isopropylidenedicyclohexanoid acid.

5. and other polymerizable crosslinkable monomers that can be coated with or without a solvent and crosslinked to yield an insoluble film with suitable electrical properties for use as a barrier layer.

The polymerizable crosslinkable monomers prepared from the above polyfunctional nuclei, can be mixed in certain proportion with monofunctional polymerizable monomers to control certain physical properties such as viscosity, flexibility, curing speed, and adhesion.

Useful $\alpha,\beta$-ethylenically unsaturated monofunctional monomers include benzoyloxyethyl acrylate, benzoyloxypropyl acrylate, benzoyloxypentyl acrylate, benzoyloxybutyl acrylate, benzoyloxyhexyl acrylate, benzoyloxyethyl methacrylate, benzoyloxypropyl methacrylate, benzoyloxybutyl methacrylate, benzoyloxypentyl methacrylate and benzoyloxyhexyl methacrylate, phenyl acrylate, phenyl methacrylate, cyclohexyl acrylate, cyclohexyl methacrylate, cyclohexyloyloxethyl acrylate, cyclohexyloyloxypropyl acrylate, cyclohexyloyloxyhexyl acrylate and combinations of these monomers.

Particularly preferred $\alpha,\beta$-ethylenically unsaturated monomers are those having carbonyl-containing substituents. In a specifically preferred form such monomers satisfy Formula 15:

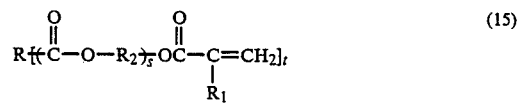

wherein

R represents a cycloaliphatic (e.g., cyclohexyl) or an aromatic (e.g., naphthyl or phenyl) group;

$R_1$ represents hydrogen or alkyl or from 1 to 6 carbon atoms, preferably hydrogen or methyl;

$R_2$ represents alkylene of 1 to 20 carbon atoms (preferably 1 to 10 carbn atoms), or $-CH_2CH_2(OCH_2CH_2)_r$;

r is 1 to 20, preferably 1 to 6;

s is 0 or 1; and t is 2 to 6, preferably 2 to 4.

Representative examples of such monomers are presented in Table I below.

TABLE I

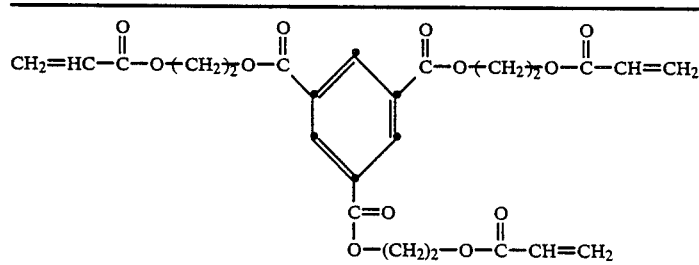

TABLE I-continued
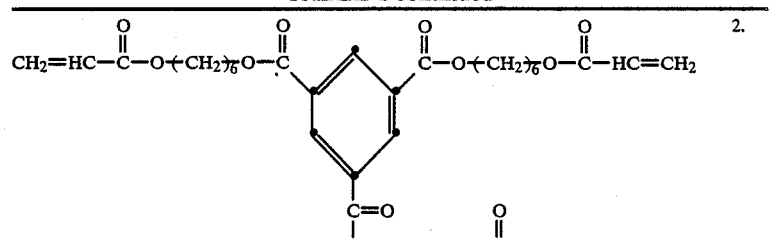
2.
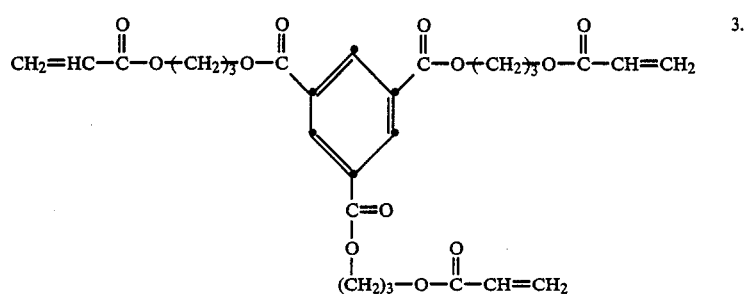
3.
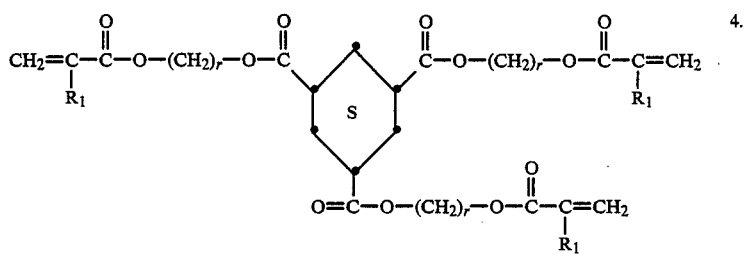
4.
$R_1 = H, CH_3$;
$r$ = one to 6.
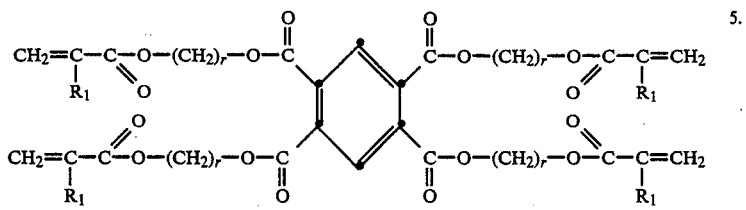
5.
$R_1 = H, CH_3$;
$r$ = one to 6.
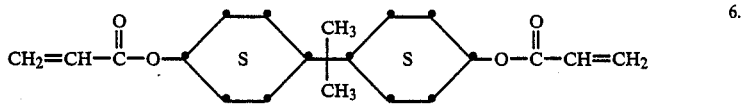
6.
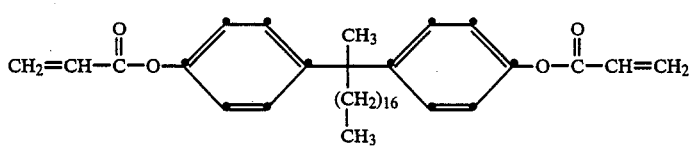
7.
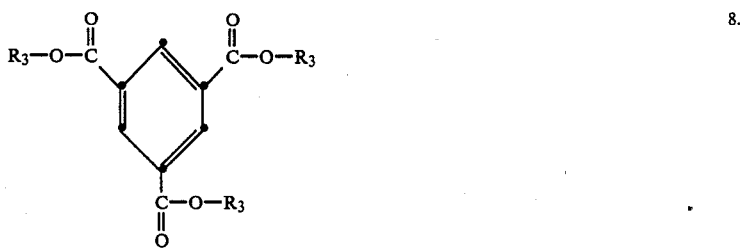
8.
$R_1 = H, CH_3$;
$r$ = 1 to 10;

TABLE I-continued

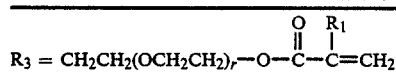

$$R_3 = CH_2CH_2(OCH_2CH_2)_r\text{---}O\text{---}\overset{O}{\underset{\|}{C}}\text{---}\overset{R_1}{\underset{|}{C}}{=}CH_2$$

The photosensitive binder precursors can be crosslinked by direct exposure to higher energy (e.g., shorter wavelength) electromagnetic radiation, such as UV radiation. To permit crosslinking by exposure to electromagnetic radiation in the near UV (290 to 390 nm) and visible portions of the spectrum, there is incorporated in the composition containing the molecular dipole and photosensitive binder precursor one or a combination of compounds acting as initiators. In a specifically preferred form two coinitiators, an activator and a photosensitizer are employed in combination.

Any of the photosensitizers and initiators disclosed in Molaire U.S. Pat. No. 4,322,490, Molaire et al U.S. Pat. No. 4,619,890, and Scozzafave et al U.S. Pat. No. 4,485,161, here incorporated by reference, can be employed in the practice of this invention.

Specht and Farid U.K. 2,083,832A, here incorporated by reference, discloses as coinitiators azinium activators and amino-substituted 3-ketocoumarin and naphthothiazole merocyanine photosensitizers which are useful in promoting photocrosslinking in the near UV and blue portions of the spectrum.

Preferred coinitiators for photocrosslinking by exposure to electromagnetic radiation of wavelengths longer than 400 nm are the specific subject matter of commonly assigned, copending filings. Farid et al U.S. Ser. Nos. 933,657 (Pat. No. 4,743,528); 933,658 (Pat. No. 2,731,529); 933,660 (Pat. No. 4,743,530), and 933,712 (Pat. No. 4,743,531), each filed Nov. 21, 1986. Farid et al teaches to employ azinium salt activators in combination with dye photsensitizers. The azinium salt activators can take any convenient conventional form. The azinium activators disclosed by Heseltine et al and Jenkins et al U.S. Reissue Pat. Nos. 27,922 and 27,925, Specht and Farid U.K. 2,083,832A, and *Research Disclosure*, Vol. 200, Dec. 1980, Item 20036, cited above, provide a variety of examples of useful azinium activators.

The azinium activators include an azinium nucleus, such as a pyridinium, diazinium, or triazinium nucleus. The azinium nucleus can include one or more aromatic rings, typically carbocyclic armatic rings, fused with an azinium ring. In other words, the azinium nuclei include quinolinium, isoquinolinium, benzodiazinium, and naphthodiazonium nuclei. To achieve the highest attainable activation efficiencies per unit of weight it is preferred to employ monocyclic azinium nuclei.

The azinium activators include a quaternizing substituent, which is preferably an oxy (e.g., alkoxy or aryoxy) or acyl radical containing from 1 to 18, preferably 1 to 8 carbon atoms. The highest activity azinium salts are those containing an oxy quaternizing substituent containing 1 to 2 carbon atoms. Other substituents to the azinium ring are not required, but can be present.

The dye photosensitizers can be selected from among any known dye class, provided they exhibit a reduction potential which in relation to that of the azinium activator is at most 0.1 volt more positive. Among specifically contemplated dye classes from which dyes can be selected are coumarin (including ketocoumarin and sulfonocoumarin) dyes, merocyanine dyes, merostyryl dyes, oxonol dyes, and hemioxonol dyes. Dyes from each of the foregoing classes all contain a keto group in the blue absorbing chromophore and are all therefore designated keto dyes. In addition, it is a specific recognition of this invention that a dye photosensitizer useful in the practice of this invention need not be a keto dye. That is, a keto group in the blue absorbing chromophore of the dye is not essential. Non-keto dyes embrace a variety of dye classes, including non-keto polymethine dyes, rhodamine dyes, anthracene dyes, acridine dyes, aniline dyes, and azo dyes. Non-keto polymethine dyes include cyanine, hemicyanine, and styryl dyes.

In one preferred form of the invention the dye photosensitizers are chosen from the polymethine dye class, which includes the cyanines, merocyanines, complex cyanines and merocyanines (i.e., tri-, tetra- and polynuclear cyanines and merocyanines), oxonols, hemioxonols, styryls, merostyryls, and streptocyanines.

The cyanine dyes include, joined by a methine linkage, two basic heterocyclic nuclei, such as azolium or azinium nuclei, for example, those derived from pyridinium, quinolinium, isoquinolinium, oxazolium, thiazolium, selenazolium, indazolium, pyrazolium, pyrrolium, indolium, 3H-indolium, imidazolium, oxadiazolium, thiadioxazolium, benzoxazolium, benzothiazolium, benzoselenazolium, benzotellurazolium, benzimidazolium, 3H- or 1H-benzoindolium, naphthoxizolium, naphthothiazolium, naphthoselenazolium, naphthotellurazolium, carbazolium, pyrrolopyridinium, phenanthrothiazolium, and acenaphthothiazolium quaternary salts.

Exemplary of the basic heterocyclic nuclei are those satisfying Formulae 16 and 17.

Formula 16

Formula 17

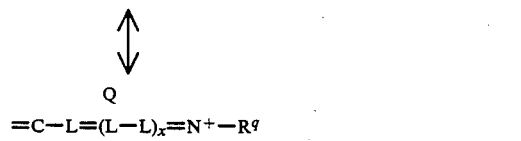

where

Z represents the elements needed to complete a cyclic nucleus derived from basic heterocyclic nitrogen compounds such as oxazoline, oxazole, benzoxazole, the naphthoxazoles (e.g., naphth[2,1-d]oxazole, naphth[2,3-d]oxazole, and naphth[1,2-d]oxazole), oxadiazole, thiazoline, thiazole, benzothiazole, the naphthothiazoles (e.g., naphtho[2,1-d]thiazole), the thiazoloquinolines (e.g., thiazole[4,5-b]quinoline), phenanthrothiazole, acenaphthothiazole, thiadioxazole, selenazoline, selenazole, benzoselenazoe, the naphthoselenazoles (e.g., naphtho[1,2-d]selenazole), benzotellurazole, naphthotellurazoles (e.g., naptho[1,2-d]tellurazole), imidazoline, imidazole, benzimidazole, the naphthimidazoles (e.g., naphth[2,3-d]imidazole), 2- or 4-pyridine, 2- or 4-quinoline, 1- or 3-isoquinoline, benzoquinoline, 3H-indole, 1H- or 3H-benzoindole, and pyrazole, which nuclei may be substituted on the ring by one or more of a wide variety of substituents such as hydroxy, the halogens (e.g., fluoro, chloro, bromo, and iodo), alkyl groups or substituted alkyl groups (e.g., methyl, ethyl, propyl, isopropyl, butyl, octyl, dodecyl, octadecyl, 2-hydroxyethyl, 3-sulfopropyl, carboxymethyl, 2-cyanoethyl, and trifluoromethyl), aryl groups or substituted aryl groups (e.g., phenyl, 1-naphthyl, 2-naphthyl, 4-sulfophenyl, 3-carboxyphenyl, and 4-biphenylyl), aralkyl groups (e.g., benzyl and phenethyl), alkoxy groups (e.g., methoxy, ethoxy, and isopropoxy), aryloxy groups (e.g., phenoxy and 1-naphthoxy), alkylthio groups (e.g., methylthio and ethylthio), arylthio groups (e.g., phenylthio, p-tolylthio, and 2-naphthylthio), methylenedioxy, cyano, 2-thienyl, styryl, amino or substituted amino groups (e.g., anilino, dimethylamino, diethylamino, and morpholino), acyl groups, (e.g., formyl, acetyl, benzoyl, and benzenesulfonyl);

Q represents the elements needed to complete a cyclic nucleus derived from basic heterocyclic nitrogen compounds such as pyrrole, indole, carbazole, benzindole, pyrazole, indazole, and pyrrolopyridine;

$R^q$ represents alkyl groups, aryl groups, alkenyl groups, or aralkyl groups, with or without substituents, (e.g., carboxy, hydroxy, sulfo, alkoxy, sulfato, thiosulfato, phosphono, chloro, and bromo substituents);

L is in each occurrence independently selected to represent a substituted or unsubstituted methine group—e.g., $-CR^5=$ groups, where $R^5$ represents hydrogen when the methine group is unsubstituted and most commonly represents alkyl of from 1 to 4 carbon atoms or phenyl when the methine goup is substituted; and x is 0 or 1.

Cyanine dyes can contain two heterocyclic nuclei of the type shown in Formula 16 joined by a methine linkage containing an uneven number of methine groups or can contain a heterocyclic nucleus according to each of Formulae 16 or 17 joined by a methine linkage containing an even number of methine groups, where the methine groups can take the form $-CR^1=$ as described above. The greater the number of the methine groups linking nuclei in the polymethine dyes in general and the cyanine dyes in particular the longer the absorption wavelengths of the dyes. For example, dicarbocyanine dyes (cyanine dyes containing five methine groups linking two basic heterocyclic nuclei) exhibit longer absorption wavelengths than carbocyanine dyes (cyanine dyes containing three methine groups linking two basic heterocyclic nuclei) which in turn exhibit longer absorption wavelengths than simple cyanine dyes (cyanine dyes containing a single methine group linking two basic heterocyclic nuclei). Carbocyanine and dicarbocyanine dyes are longer wavelength dyes while simple cyanine dyes are typically yellow dyes, but can exhibit absorption maxima up to about 550 nm in wavelength with proper choice of nuclei and other components capable of bathochromically shifting absorption.

One of the techniques for bathochromically shifting the absorption maxima of polymethine dyes in general and cyanine dyes in particular is to include in the methine linkage an oxocarbon bridging nucleu. Exemplary oxocarbon bridging nuclei can take any of the forms indicated by Formula 18.

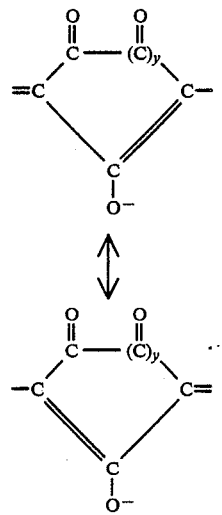

Formula 18 wherein y is the integer 0, 1, or 2.

Merocyanine dyes link one of the cyanine dye type basic heterocyclic nuclei described above to an acidic keto methylene nucleus through a methine linkage as described above, but containing zero, two, or a higher even number of methine groups. Zero methine dyes, those containing no methine groups in the linkage between nuclei, exhibit a double bond linkage between the nuclei in one resonance form and a single bound linkage in another resonance form. In either resonance form the linkage sites in the nuclei are formed by methine groups forming a part of each nucleus. Zero methine polymethine dyes are yellow dyes.

Exemplary acidic nuclei are those which satisfy Formula 19.

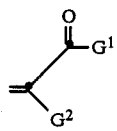

Formula 19 where $G^1$ represents an alkyl group or substituted alkyl group, an aryl or substituted aryl group, an aralkyl group, an alkoxy group, an aryloxy group, a hydroxy group, an amino group, or a substituted amino group, wherein exemplary substituents can take the various forms noted in connection with Formulae 1 and 2;

$G^2$ can represent any one of the groups listed for $G^1$ and in addition can represent a cyano group, an alkyl, or arylsulfonyl group, or a group represented by

or $G^2$ taken together with $G^1$ can represent the elements needed to complete a cyclic acidic nucleus such as those derived from 2,4-oxazolidinone (e.g., 3-ethyl-2,4-oxazolidindione), 2,4-thiazolidindione (e.g., 3-methyl-2,4-thiazolidindione), 2-thio-2,4-oxazolidindione (e.g., 3-phenyl-2-thio-2,4-oxazolidindione), rhodanine, such as 3-ethylrhodanine, 3-phenylrhodanine, 3-(3-dimethylaminopropyl)rhodanine, and 3-carboxymethylrhodanine, hydantoin (e.g., 1,3-diethylhydantoin and 3-ethyl-1-phenylhydantoin), 2-thiohydantoin (e.g., 1-ethyl-3-phenyl-2-thiohydantoin, 3-heptyl-1-phenyl-2-thiohydantoin, and arylsulfonyl-2-thiohydantoin), 2-pyrazolin-5-one, such as 3-methyl-1-phenyl-2-pyrazolin-5-one, 3-methyl-1-(4-carboxybutyl)-2pyrazolin-5-one, and 3-methyl-2-(4-sulfophenyl)-2-pyrazolin-5-one, 2-isoxazolin-5-one (e.g., 3-phenyl-2-isoxazolin-5-one), 3,5-pyrazolidindione (e.g., 1,2-diethyl-3,5-pyrazolidindione and 1,2-diphenyl-3,5-pyrazolidindione), 1,3-indandione, 1,3-dioxane-4,6-dione, 1,3-cyclohexanedione, barbituric acid (e.g., 1-ethylbarbituric acid and 1,3-diethylbarbituric acid), and 2-thiobarbituric acid (e.g., 1,3-diethyl-2-thiobarbituric acid and 1,3-bis(2-methoxyethyl)-2-thiobarbituric acid).

Useful hemicyanine dyes are essentially similar to the merocyanine dyes described above, differing only in substituting for the keto methylene group of Formula 19 the group shown below in Formula 20.

Formula 20 where $G^3$ and $G^4$ may be the same or different and may represent alkyl, substituted alkyl, aryl, substituted aryl, or aralkyl, as illustrated for ring substituents in Formula 1 or $G^3$ and $G^4$ taken together complete a ring system derived from a cyclic secondary amine, such as pyrrolidine, 3-pyrroline, piperidine, piperazine (e.g., 4-mthylpiperazine and 4-phenylpiperazine), morpholine, 1,2,3,4-tetrahydroquinoline, decahydroquinoline, 3-azabicyclo[3,2,2]nonane, indoline, azetidine, and hexahydroazepine.

Useful hemioxonol dyes exhibit a keto methylene nucleus as shown in Formula 19 and a nucleus as shown in Formula 20 joined by a methine linkage as previously described containing one or a higher uneven number of methine groups.

Useful merostyryl dyes exhibit a keto methylene nucleus as shown in Formula 19 and a nucleus as shown in Formula 21 joined by a methine linkage as described above containing one or a higher uneven number of methine groups.

Formula 21 where $G^3$ and $G^4$ are as previously defined.

The cyanine, merocyanine, hemicyanine, hemioxonol, and merostyryl dyes described above are intended to be illustrative of the simpler structural forms of useful polymethine dyes. It is generally recognized that substituents can join the nuclei and methine linkages to form additional cyclic structures. Further, the dyes can contain three or more nuclei. For example, by substituting a merocyanine dye in its methine linkage with a second basic heterocyclic nucleus of the cyanine dye type an allopolar cyanine dye can be formed. Further, the various substituents not forming a part of the dye chromophore can be varied as desired to tailor dye physical properties, particularly hydrophobicity and hydrophillicity, to suit the particular film forming components employed. By choosing as the aliphatic moieties of the dyes hydrocarbon groups having more carbon atoms (e.g., from about 6 to 20 carbon atoms) the dyes can be rendered more oleophilic while hydrocarbon groups containing fewer numbers of carbon atoms (e.g., 1 to 5 carbon atoms) and particularly those bearing polar substituents render the dyes more hydrophilic. The aromatic moieties of the dyes typically contain from 6 to 10 carbon atoms.

When employing a coinitiators azinium activators and dye photosensitizers, the azinium activator is preferably present in a concentration of from $2\times10^{-5}$ to $25\times10^{-5}$, most preferably from about $5\times10^{-5}$ to $20\times10^{-5}$, mole per gram of the binder precursor.

The photosensitizer can be present in any concentration capable of increasing the response of the binder precursor composition including the activator to visible light. While the photosensitizer concentration can vary widely, it is generally contemplated to employ photosensitizer in concentrations ranging from about $5\times10^{-7}$ to $1\times10^{-4}$ mole per gram of binder precursor. Preferred photosensitizer concentrations are in the range of from $10^{-6}$ to $5\times10^{-5}$ mole per gram of binder precursor, with optimum concentrations generally being in the range of from about $2\times10^{-6}$ to $2\times10^{-5}$ mole per gram of binder precursor.

The concentration of the molecular dipoles in the crosslinked polymeric binder can be widely varied. In most instances it is preferred that the molecular dipole be present in a concentration of at least 1 percent, based on the weight of crosslinked polymeric binder. It is generally preferred that the molecular dipole be present in a concentration of at least 10 percent by weight, based on the weight of the crosslinked polymeric binder. To increase the hyperpolarizability density ($\beta/V$, where V is the volume of the transmission medium) generally the highest attainable concentration of the molecular dipole in the crosslinked polymeric binder is sought. This is a function of the solubility of the molecular dipole in the binder precursor, both before and during crosslinking. For example, concentrations so high as to produce phase separation of the molecular dipole and binder precursor are to be avoided. Molecular dipole concentrations of the up to 50 percent, based on the weight of the crosslinked polymeric binder, may be obtained with the most highly compatible combinations of molecular dipoles and polymeric binders, with molecular dipole concentrations of at least 20 percent, based on the weight of the crosslinked polymeric binder, being generally attainable.

The specific choice of polymeric binders and molecular dipoles will be influenced by the wavelengths of electromagnetic radiation intended to be propagated in the optical transmission media. The preferred optical articles of this invention are those which exhibit the lowest possible absorptions of electromagnetic radiation in the optically active transmission medium. For optical articles which are intended to propagate a single wavelength or range of wavelengths of electromagnetic radiation, molecular dipoles and crosslinked polymeric binders are chosen which exhibit absorption minima within the wavelength region of propagation. Where the optical article itself receives electromagnetic radiation of one wavelength and internally produces for transmission electromagnetic radiation of a differing wavelength, the transmission medium is preferably chosen to exhibit minimal absorptions in both spectral regions. For example, if it is intended to employ an optical article according to this invention for second harmonic generation in response to infrared radiation received from a laser, such a laser emitting in the 800 to 1600 nm region of the spectrum, the molecular dipoles and crosslinked polymeric binder are chosen to exhibit the lowest levels of absorption possible at the laser wavelength in the infrared and at the wavelength of the second harmonic in the visible spectrum.

The choice of initiators for photocrosslinking is related to the wavelengths of electromagnetic propagation sought in the optical article. To facilitate crosslinking the initiators preferably exhibit absorption maxima in the spectral regions where the binder precursor is transparent. Since $\alpha,\beta$-ethylenically unsaturated binder precursors, particularly those containing acrylic and methacrylic crosslinking groups, are highly transparent in the visible region of the spectrum, the use of dye photosensitizers as coinitiators is highly advantageous. While any residual photosensitizer remaining in the crosslinked polymeric binder will absorb light in the visible spectrum, in the completed optical article the concentrations of the photosensitizers are in general too low to exhibit any significant elevation of internal energy losses in the optically active transmission media.

EXAMPLES

The invention can be better appreciated by reference to the following specific examples:

EXAMPLE 1

4-Methylmercaptobenzyl chloride

To a stirred solution of 154 g (1 mol) of 4-methylmercaptobenzyl alcohol in 1 liter of dry bensene was added dropwise 80 ml 1.1 mol) of thionyl chloride. The mixture immediately turned blue. After the addition of the thionyl chloride was completed, the mixture was heated at reflux for 2 hours. After cooling the benzene and excess thionyl chloride were distilled at ambient pressure. The product was distilled in vacuo at 105° C. (0.5 mm), to yield 160 g (93%) of water clear liquid.

$^1$NMR (300 MHz, CDCl$_3$, $\delta$) 2,49 (s, 3H), 4.57 (s, 2H), 7.28 (AB, $\Delta v$=22 Hz, J=8.3 Hz, 4H).

EXAMPLE 2

Diethyl 4-Methylmercaptobenzylphosphonate

4-Methylmercaptobenzyl chloride (160 g, 0.94 mol) was added dropwise, under nitrogen, with stirring to 183 g (1.1 mole) of triethylphosphite which was heated at reflux. When the addition of the 4-methylmercaptobenzyl chloride was completed, the mixture was refluxed for additional 4 hours. The product was distilled under vacuo to yield 229 g (89%) of water clear, viscous liquid bp 142°-145° C. (0.025 mm).

$^1$H NMR (300 MHz, CDCl$_3$, $\delta$): 1.27 (t, J=7.2 Hz, 6H), 2.49 (s, 3H), 3.13 (d, J=21.6 Hz, 2H), 4.04 (quintet, J=7.4 Hz, 4H), 7.66 (AB, $\Delta v$=115.1 Hz, 4H).

EXAMPLE 3

Diethyl 4-Methylsulfonlbenzylphosphonate

To a stirred solution of 174 g (0.6 mole) of diethyl 4-methylmercaptobenzylphosphonate in 500 mL of glacial acetic acid was added dropwise 171 g (1.5 moles) of hydrogen peroxide (30% in water). The mixture was heated at reflux for 2 hours. After cooling, the water and acetic acid were removed under reduced pressure and the residue was distilled to yield 121 g (66%) of very viscous liquid bp 214°-216° C. (2×10$^{-4}$ mm).

$^1$H NMR (300 MHz, CDCl$_3$ $\delta$): 1.23 (t, J=9.6 Hz, 6H), 3.01 (s), 3.19 (d, J=22.2 Hz, 2H), 4.02 (quintet, J=7.4 Hz, 4H), 7.66 (AB, $\Delta v$=115.1 Hz, J=8.1, 4H).

EXAMPLE 4

4'-Diallylamino-4-methylsulfonylstilbene (G1)

To a suspension of 3.4 g (0.0845 mol) of 60% sodium hydride dispersion, 13.5 g (0.675 mol) of N,N-diallylaminobenzaldehyde and 200 mL of dry, freshly distilled 1,2-dimethoxyethane (DME) was added, under nitrogen, with vigorous stirring a solution of 20.6 g (0.675 mole) of diethyl 4-methylsulfonylbenzylphosphonate in 50 mL DME. The mixture immediately turned bright yellow. The reaction mixture was heated at reflux for two hours. After cooling the bright yellow solution was poured over 250 g of crushed ice under a nitrogen blanket. The bright yellow solid was collected by filtration, washed with cold water, and air dried. Recrystallization from methanol to yields 18.2 g (78%) of bright yellow crystals mp 101°-102° C.

$^1$H MNR (300 MHz, CDCl$_3$, $\delta$): 3.07 (s, 3H), 3.99 (d, broad, J=4.5 Hz, 4H), 5.18 (d, J=3.6 Hz, 2H) 5.23 (s, 2H, 5.89 (m, 1H), 7.07 (AB, $\Delta v$=210.8 Hz, J=8.7 Hz, 4H), 7.05 (AB, $\Delta v$=82.7 Hz, J=16.2 Hz, 2H), 7.76 (AB, $\Delta v$=78.3 Hz, J=8.3 Hz, 4H).

EXAMPLE 5

4-Dimethylamino-4-methylsulfonylstilbene (G2)

To a solution of 2.8 g (0.07 mol) of 60% sodium hydride dispersion, 7.46 g (0.05 mole) N,N-dimethylaminobenzaldehyde, and 100 ml of dry, freshly distilled 1,2-dimethoxyethane (DME) under nitrogen, at room temperature, was added 15.3 g (0.05 mole) diethyl 4-methylsulfonylbenzylphosphonate with vigorous stirring. The mixture immediately turned bright yellow. The mixture was heated at reflux for 2 hours. After cooling the very bright yellow solution was poured over 300 g of crushed ice under nitrogen blanket. The right yellow solid was collected by filtration, washed with water, and air dried. Recrystallization from a 1:1 mixture of absolute ethanol and dry pyridine yielded 9.97 g (66%) of bright yellow crystals mp 242°-243° C.

$^1$H NMR (300 MHz, CDCl$_3$, $\delta$): 3.01 (s, 6H), 3.06 (s, 3H), 7.08 (AB, $\Delta v$=216.8 Hz, J=8.6 Hz, 4H), 7.05 (AB, $\Delta v$=82.5 Hz, J=16.2 Hz, 2H), 7.74 (AB, $\Delta v$=76.6 Hz, J=8.2 Hz, 4H).

EXAMPLE 6

4'-[N-Methyl-N-(6-hydroxyhexyl)amino-4-methyl]-sulfonylstilbene (G3)

To a solution of 5 g (0.125 mol) 60% sodium hydride dispersion, 27.7 g (0.1 mole) of N-methyl-N-(6-acetoxyhexyl)aminobenzaledhyde and 200 mL of dry, freshly distilled 1,2-dimethoxyethane (DME) under nitrogen, at room temperature, with vigorous stirring was added 30.6 g (0.1 mole) of diethylsulfonylbenzylphosphonate. The mixture immediately turned yellow. The reaction mixture was heated at reflux for 2 hours. The bright yellow solution was poured over 400 g of crushed ice under a nitrogen blanket and the resulting mixture was extracted with four 250 mL portions of dichloromethane. The combined organic extracts were washed three times with 250 mL of water, and the solvent was removed at reduced pressure. The residue was dissolved in 250 mL of 10% (v/v) HCl in 1:1 ethanol:water and the solution was heated at refluxed for 4 hours. After cooling the solution was neutralized to pH 7 by the slow and careful addition of sodium carbonate. The yellow solid thus formed was collected by filtration, washed with water and air dried. Recrystallization from methanol yields 31.4 g of bright yellow solid (81%). This material contained some acetate which was not hydrolized ($\approx$5%). A pure sample of the material was obtained by chromatography. Thus, 5 g of the material was dissolved in 25 ml of a mixture of acetone:ethylacetate 1:5, and loaded onto a dry silica gel column (500 g, is a 2" diameter Elution gave 4.5 g of pure material which was then crystallized from absolute methanol mp 113°-115° C.

$^1$H NMR (300 MHz, CDCl$_3$, $\delta$): 1.45 (m, 4H), 1.63 (m, 4H), 3.01 (s, 3H), 3.09 (s, 3H), 3.39 (t, J=7.6 Hz, 2H), 3.69 (t, broad, 2H).

EXAMPLE 7

4-(1-Piperidinyl)benzaldehyde

A mixture of 10.0 g (81 mmol) of 4-fluorobenzaldehyde, 6.86 g (81 mmol) of piperidine, 8.54 g (81 mmol) of sodium carbonate, 50 mL dimethylsulfoxide (DMSO), and 2 drops tricaprylmethylammonium chloride were heated with stirring at 100° C. under nitrogen for 24 hours. Additional piperidine (1.0 g) was added, and the reaction was continued for another 24 hours. The reaction mixture was cooled and poured into 700 mL of water. The resulting milky solution was extracted with toluene (3×300 mL), and the combined organic extracts were washed with water, dried (MgSO$_4$), and the solvent was removed at reduced pressure. A brown oil was deposited which gradually crystallized on standing. The product was recrystallized from isopropanol (Norit) to provide 7.48 (49%) of a gold solid, mp 59.5°-61.5° C.

$^1$H NMR (300 MHz, CDCl$_3$) $\delta$ 1.68 (br s, 6H), 3.41 (br s, 4H), 6.90 (d, 2H), 7.82 (d, 2H), 9.75 (s, 1H).

EXAMPLE 8

4-Dibutylaminobenzaldehyde

A 20 ml sample of N,N-dimethylformamide (DMF) was cooled to 0° C. for 1 hour and at 25° C. for 1 hour, then N,N-dibutylaniline was added slowly. The reaction mixture was heated at 90° C. for 16 hours, then cooled and poured onto 50 g of ice. A brown oil separated which was taken up in dichloromethane. The extract was washed with saturated aqueous bicarbonate then with water containing a little ammonium chloride, dried (MgSO$_4$), and the solvent was removed at reduced pressure. The brown, oily residue was distilled in vacuo to product 6.65 g (58%) of a yellow liquid.

$^1$H NMR (300 MHz, CDCl$_3$) $\delta$ 0.93 (t, 6H, 1.33 (m, 4H), 1.56 (m, 4H), 3.30 (t, 4H), 6.60 (d, 2H), 7.66 (d, 2H), 9.65 (s, 1H).

$^{13}$C{$^1$H} NMR (75.5 MHz, CDCl$_3$) $\delta$ 13.7, 20.0, 29.1, 50.6, 110.5, 124.3, 132.0, 152.4, 189.6.

EXAMPLE 9

4-(4-Morpholino)benzaldehyde

4-Phenylmorpholine (10.0 g, 61 mmol) was reacted with DMF (20 mL) and phosphorous oxychloride (9.39 g, 61 mmol) as above. The brown solid which was isolated after neutralization of the reaction mixture was recrystallized repeatedly from isopropanol to produce 2.53 g (22%) of a tan product, mp 56°-66° C.

$^1$H NMR (300 MHz, CDCl$_3$) $\delta$ 3.33 (t, 4H), 3.85 (t, 4H), 6.90 (d, 2H), 7.76 (d, 2H), 9.79 (s, 1H).

$^{13}$C{$^1$H} NMR (75.5 MHz, CDCl$_3$) $\delta$ 47.2, 67.3, 111.3, 128.5, 131.6, 155.0, 189.3.

EXAMPLE 10

Julolidine-6-carboxaldehyde

Julolidine (5.00 g, 29 mmol) was reacted with DMF (9.5 g) and phosphorous oxychloride (4.87 g, 32 mmol) as above. The tan solid which was isolated after neutralization of the reaction mixture which was recrystallized from isopropanol (Norit) to produce 4.22 g (73%) of a light tan needles, mp 80°-82° C. (lit[1] 83° C.). An analytical sample was obtained by sublimation in vacuo.

$^1$H NMR (300 MHz, CDCl$_3$) $\delta$ 1.95 (m, 2H), 2.75 (t, 2H), 3.28 (t, 2H), 7.28 (s, 2H), 9.58 (s, 1H).

$^{13}$C{$^1$H} NMR (75.5 MHz, CDCl$_3$) $\delta$ 21.2, 27.6, 49.9, 120.3, 124.0, 129.3, 147.7, 189.9. Anal. Calcd for C$_{13}$H$_{15}$NO: C, 77.58; H, 7.51; N, 6.96. Found: C, 77.6; H, 7.5; N, 7.0.

EXAMPLE 11

4'-Diethylamino-4-nitrostilbene (G4)

A mixture of 5.00 g (28 mmol) of 4-diethylaminobenzaldehyde, 5.62 g (31 mmol) of 4-nitrophenylacetic acid, 2.40 g (28 mmol) of piperidine, and 100 mL of xylenes was heated with stirring at reflux for 20 hours with continuous removal of water using a Dean-Stark apparatus. The mixture turned dark red. Approximately half the xylenes was distilled, and the residue was cooled to $^3$0° C. Red crystals separated which were collected and then recrystallized from isopropanol/pyridine. Yield: 4.05 g (48%), mp 179-181 (lit[2] 182°-182.5° C.).

$^1$H NMR (300 MHz, CDCl$_3$) $\delta$ 1.20 (6, 6H), 3.40 (q, 4H), 6.66 (d, 2H), 6.88 (d, 1H), 7.20 (d, 1H), 7.42 (d, 2H), 7.54 (d, 2H), 8.16 (d, 2H).

$^{13}$C{$^1$H} NMR (75.5 MHz, CDCl$_3$) $\delta$ 12.6, 44.4, 111.5, 120.9, 123.3, 124.1, 125.9, 128.7, 133.8, 145.2, 145.7, 148.3. UV/Vis (CH$_2$Cl$_2$): 449 nm ($\epsilon$=28900).

EXAMPLE 12

4'-Dibutylamino-4-nitrostilbene (G5)

A mixture of 5.00 g (21 mmol) of 4-dibutylaminobenzaldehyde, 4.27 g (24 mmol) of 4-nitrophenylacetic acid, 1.80 g (21 mmol) of piperidine, and 50 mL of xylenes was heated with stirring at reflux of 20 hours with continuous removal of water using a Dean-Stark apparatus. The mixture turned dark red. Approximately half the xylenes was distilled, 20 mL of heptane was added, and the residue was cooled to −30° C. Red crystals separated which were collected and then recrystallized from toluene/heptane. Yield: 2.81 g (37%), mp 117-119 (lit[2] 182°-182.5° C.).

$^1$H NMR (300 MHz, CDCl$_3$) $\delta$ 0.96 (t, 6H), 1.37 (m, 4H), 1.58 (m, 4H), 3.30 (t, 4H), 6.62 (d, 2H, 6.86 (d, 1H), 7.18 (d, 1H), 7.36 (d, 2H), 7.52 (d, 2H), 8.16 (d, 2H).

$^{13}$C{$^1$H} NMR (75.5 MHz, CDCl$_3$) $\delta$ 14.0, 20.3, 29.4, 50.7, 111.5, 120.8, 123.1, 124.1, 125.9, 128.6, 133.8, 145.2, 145.8, 148.8. UV/Vis (CH$_2$Cl$_2$): 454 nm ($\epsilon$=28300).

EXAMPLE 13

4'-(2-Pyrrolidino)-4-nitrostilbene

A mixture of 10.0 g (57 mmol of 4-(1-pyrrolidino)benzaldehyde, 11.4 g (63 mmol) of 4-nitrophenylacetic acid, 5.35 g (63 mmol) of piperidine, and 100 mL of xylenes was heated with stirring at reflux for 20 hours with continuous removal of water using a Dean-Stark apparatus. The mixture turned dark red. Approximately half the xylenese was distilled, and the residue was cooled to $-30°$ C. Red crystals separated which were collected and then recrystallized from isopropanol/pyridine. Yield: 7.72 g (46%), mp 254°–7° C.

$^1$H NMR (300 MHz, CDCl$_3$) $\delta$ 2.05 (m, 4H), 6.62 (d, 2H), 6.90 (d, 1H), 7.20 (d, 1H), 7.44 (d, 2H), 7.55 (d, 2H), 8.16 (d, 2H).

$^{13}$C{$^1$H} NMR (75.5 MHz, CDCl$_3$) $\delta$ 25.4, 48.2, 112.4, 121.3, 124.1, 126.0, 128.6, 133.9, 145.1, 145.9, 147.8. UV/Vis (CH$_2$Cl$_2$): 445 nm ($\epsilon$=36400).

EXAMPLE 14

4'-(1-Piperidino)-4-nitrostilbene (G7)

A mixture of 5.00 g (26 mmol) of 4-dibutylaminobenzaldehyde, 5.26 g (29 mmol) of 4-nitrophenylacetic acid, 2.47 g (29 mmol) of piperidine, and 50 ml of xylenes was heated with stirring at reflux for 72 hours with continuous removal of water using a Dean-Stark apparatus. The mixture turned dark red. Approximately half the xylenes was distilled, and the residue was cooled to $-30°$ C. Red crystals separated which were collected and then recrystallized from isopropanol/pyridine. Yield: 2.91 g (36%), mp 239°–241° C.

$^1$H NMR (300 MHz, CDCl$_3$) $\delta$ 1.70 (m, 6H), 3.37 (m, 4H), 6.90 (br d, 2H), 6.95 (d, 1H), 7/21 (d, 1H), 7.43 (d, 2H), 7.56 (d, 2H), 8.18 (d, 2H).

$^{13}$C{$^1$H} NMR (75.5 MHz, CDCl$_3$) $\delta$ 24.3, 25.5, 49.7, 115.6, 122.6, 124.1, 126.2, 128.2, 133.3, 144.7, 146.1. UV/VIS (CH$_2$Cl$_2$): 423 nm ($\epsilon$=23600).

EXAMPLE 15

4'-(4-Morpholino)-4-nitrostilbene (G8)

A mixture of 5.00 g (10.5 mmol) of 4-(4-morphilino)-benzaldehyde, 2.08 g (11.5 mmol) of 4-nitrophenylacetic acid, 0.89 g (10.5 mmol) of piperidine, and 50 mL of xylenes was heated with stirring at reflux for 72 hours with continuous removal of water using a Dean-Stark apparatus. The mixture turned dark red. Approximately half the xylenes was distilled, and the residue was diluted with 150 ml of dichloromethane. The resulting solution was washed with water (2×100 mL), dried (MgSO$_4$), and concentrated to circa 20 mL. A red solid separated, which was collected and recrystallized from toluene. Yield: 0.81 g (26%), mp 231°–4° C.

$^1$H NMR (300 MHz, CDCl$_3$) $\delta$ 3.22 (t, 4H), 3.86 (t, 4H), 6.90 (d, 2H), 6.98 (d, 1H), 7.19 (d, 1H), 7.46 (d, 2H), 7.56 (d, 2H), 8.18 (d, 2H).

$^{13}$C{$^1$H} NMR (75.5 MHz, CDCl$_3$) $\delta$ 51.2, 66.7, 115.2, 123.3, 124.2, 126.4, 127.3, 128.2, 133.1, 144.5, 146.2, 151.5. UV/VIS (CH$_2$Cl$_2$): 404 nm ($\epsilon$=27700).

EXAMPLE 16

6-[2-(4-nitrophenyl)ethyl]julolidine (G9)

A mixture of 3.00 g (15 mmol) of julolidine-6-carboxaldehyde, 2.97 g (16 mmol) of 4-nitrophenylacetic acid, 1.40 g (16 mmol) of piperidine, and 50 mL of xylenes was heated with stirring at reflux for 96 hours with continuous removal of water using a Dean-Stark apparatus. The mixture turned dark red. The reaction mixture was cooled to circa $-30°$ C., and a dark purple solid separated, which was collected and recrystallized from toluene. Yield: 1.28 g (27%), mp 165°–8° C. An analytical sample was obtained by sublimation at 130° C. (10$^{-5}$ mm), mp 168°–169.5° C.

$^1$H NMR (300 MHz, CDCl$_3$) $\delta$ 2.00 (m, 4H), 2.77 (d, 4H), 3.12 (d, 4H), 6.84 (d, 1H), 7.00 (s, 2H), 7.11 (d, 1H), 7.52 (d, 2H), 8.16 (d, 2H).

$^{13}$C{$^1$H} NMR (75.5 MHz, CDCl$_3$) $\delta$ 21.7, 27.7, 49.9, 120.4, 121.2, 123.2, 124.1, 125.8, 126.2, 134.0, 143.6, 145.3, 145.5 UV/VIS (CH$_2$Cl$_2$): 470 nm ($\epsilon$=28200). Anal. Calcd for C$_{20}$H$_{20}$N$_2$O$_2$: C, 74.89; H, 6.29; N, 8.71. Found: C, 75.1; H, 6.3; N, 8.6.

EXAMPLE 17

4'-[(6-methacryloyloxyhexyl)methylamino]4-nitrostilbene (G10)

4-[(6-hydroxyhexyl)methylamino]-4-nitrostilbene (4.45 g, 12.6 mmol) was treated with triethylamine (1.60 g, 15.7 mmol) and methacryloyl chloride (1.64 g, 15.7 mmol) as above. The product recrystallized from acetone/hexanes to yield 4.43 g (84%) of an orange solid, mp 109°–111° C.

$^1$H NMR (300 MHz, CDCl$_3$) $\delta$ 1.40 (m, 4H), 1.68 (m, 4H), 1.94 (s, 3H), 2.99 (s, 3H), 3.336 (t, 2H), 4.15 (t, 2H), 5.55 (s, 1H), 6.10 (s, 1H), 6.66 (d, 2H), 6.90 (d, 1H), 7.20 (d, 1H), 7.42 (d, 2H), 7.54 (d, 2H), 8.16 (d, 2H). $^{13}$C{$^1$H} NMR (75.5 MHz, CDCl$_3$) $\delta$ 18.3, 25.9, 26.7, 28.6, 38.4, 52.4, 64.6, 111.8, 123.9, 121.3, 124.1, 125.2, 126.0, 128.5, 133.7, 136.5, 145.1, 145.8, 149.7, 167.5. FD-MS 422 m/e. UV/Vis 443 nm ($\epsilon$=28200). Anal. Calcd for C$_{25}$H$_{30}$N$_2$O$_4$: C, 71.07; H, 7.16; N, 6.63. Found: C, 70.7; H, 7.1; N, 6.4.

EXAMPLE 18

Formation of a Poled Transmission Medium Containing a High $\chi^{(2)}$

The molecular dipole $\beta,\beta$-dicyano-4-diethylaminostyrene (G14) in the amount of 0.16 gram was dissolved in 10 grams of the monomeric binder precursor tris(2-acryloylethyl)-1,3,5-benzene tricarboxylate along with the activator ethyl 4-diethylaminobenzoate (A1) in the amount of 0.37 gram and the photosensitizer 3-benzoyl-5,7-di-n-propoxycoumarin PS-1) in the amount of 0.18 gram, present as coinitiators. One ml of dichloromethane was added to insure complete dissolution of the ingredients, and the resulting solution was stirred for 2 hours. The solution was concentrated until most of the dichloromethane had been removed.

Using a syringe the solution was placed between transparent indium tin oxide (ITO) electrodes deposited on optical flat quartz substrates separated by a 25 $\mu$m poly(ethylene terephthalate) spacer. When the gap between the electrodes was filled, a DC voltage of $3.7\times10^5$ V/cm was applied across the electrodes to pole the molecular dipoles. The poled solution was exposed for 45 minutes with a 200 watt mercury vapor lamp to near UV radiation to create an optical article containing an optically active transmission medium comprised of polar aligned molecular dipoles and a crosslinked polymeric binder. Upon removal of the externally applied electric field, the molecular dipoles remained in polar alignment. The transmission medium produced appeared on visual inspection to be transparent and colorless.

The polar alignment of the molecular dipoles before, during, and after photocrosslinking was probed by supplying infrared radiation from a laser at 1064 nm and observed visible light produced as a second harmonic at 532 nm. The unpoled material prior to crosslinking exhibited no second harmonic of the laser beam. Poling of the uncrosslinked material produced a second harmonic, but no second harmonic was in evidence when poling of the uncrosslinked solution was discontinued. Following poling and crosslinking a second harmonic was generated equal in intensity to that observed when the uncrosslinked solution was poled. Laser examination after an extended period of months revealed no reduction in second harmonic generation.

When the same composition was poled and crosslinked, but without the molecular dipole present, a second harmonic was in evidence on laser examination, but the sample containing the molecular dipole exhibited a second harmonic that was about an order of magnitude larger.

The second order polarization susceptibility $\chi^{(2)}$ of the optically active transmission medium at 1900 nm was determined 6 months after original poling to be approximately $10^{-9}$ esu.

EXAMPLES 19

Formation of a Poled Transmission Medium Containing a Higher Concentration of β,β-Dicyano-4-diethylaminostyrene (G14)

Example 18 was repeated, except that the concentration of the molecular dipole G14 was increased to 3 weight percent, based on the weight of the binder precursor. Second harmonic generation was observed similarly as in Example 18.

EXAMPLE 20

Formation of a Poled Transmission Medium Containing a Higher Concentration of 4'-Diallylamino-4-methylsulfonylstilbene (G1)

Example 18 was repeated, except that 4'-diallylamino-4-methylsulfonylstilbene (G1) in the increased concentration of 9.5 percent by weight, based on the weight of the binder precursor, was substituted for G14. Instead of the coinitiators A1 and PS1 the coinitiator pair of activator 1-methoxy-4-phenylpyridinium tetrafluoroborate (A2) and photosensitizer (PS2)

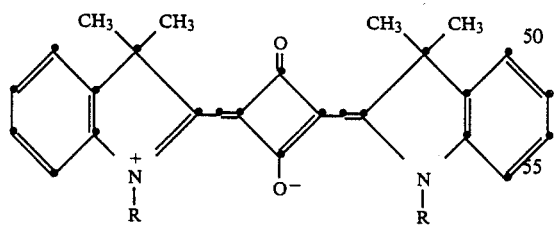

R = phenyl.

was employed. Second harmonic generation was observed similarly as in Example 18.

EXAMPLE 21

Formation of a Poled Transmission Medium Using a Lower Poling Field Gradient

Example 20 was repeated, except that the field gradient across the electrodes was decreased to $0.8 \times 10^5$ V/cm. Second harmonic generation was observed similarly as in Example 18.

EXAMPLE 22

Formation of a Poled Transmission Medium Using Side-by-Side Electrodes

Two electrodes were formed on a single optical flat quartz substrate by evaporating chromium to a thickness of about 400Å in two adjacent areas separated by a gap of 250 μm. One percent by weight of the molecular dipole 4-dimethylamino-4'-methylsulfonylstilbene (G2) was dissolved in the monomeric binder precursor tris(2-acryloylethyl)-1,3,5-benzene tricarboxylate along with a small amount of the coinitiators A1 and PS1 and dichloromethane, similarly as in Example 18. The electrode and intervening gap surface of the quartz substrate was first thoroughly wetted with the solution. The substrate bearing the electrodes was then spun for 2 minutes to produce a smooth uniform coating. A field gradient of $10^5$ V/cm was placed across the gap by connection to the electrodes. Exposure to near UV radiation as in Example 18 for 15 minutes produced crosslinking. Second harmonic generation was observed similarly as in Example 18.

EXAMPLE 23

Poled Transmission Medium Containing 4'-[N-Ethyl-N-(2-hydroxyethyl)amino]-4-nitroazobenzene (G13)

The procedure of Example 22 was repeated, except that 3 weight percent, based on the weight of the binder precursor, of the molecular dipole G13 was substituted for the molecular dipole G2. Second harmonic generation was observed similarly as in Example 18.

EXAMPLE 24

Poled Transmission Medium Containing 4'-Dibutylamino-4-nitrostilbene (G5)

The procedure of Example 22 was repeated, except that 5 weight percent, based on the weight of the binder precursor, or the molecular dipole G5 was substituted for the molecular dipole G2. Second harmonic generation was observed similarly as in Example 18.

EXAMPLE 25

Poled Transmission Medium Containing 5-{3-[4-(N,N-Diethylamino)phenyl]-2propen-1-ylidene}-2,2-dimethyl-1,3-dioxan-4,6-dione (G15)

The procedure of Example 22 was repeated, except that 5 weight percent, based on the weight of the binder precursor, of the molecular dipole G15 was substituted for the molecular dipole G2. Second harmonic generation was observed similarly as in Example 18.

EXAMPLE 26

Poled Transmission Medium Containing 4'-Di(2-chloroethyl)amino-4-nitrostilbene (G11)

The procedure of Example 22 was repeated, except that 8 weight percent, based on the weight of the binder precursor, of the molecular dipole G11 was substituted for the molecular dipole G2 and the exposure time was increased to 30 minutes. Second harmonic generation was observed similarly as in Example 18.

EXAMPLE 27

Poled Transmission Medium Containing 4'-[(6-Methacryloxyoxyhexyl)methylamino]-4-nitrostilbene (G10)

The procedure of Example 26 was repeated, except that the molecular dipole G10 was substituted for G11. Second harmonic generation was observed similarly as in Example 18.

EXAMPLE 28

Poled Transmission Medium Containing 6-[2-(4-Nitrophenyl)ethyl]julolidine (G9)

The procedure of Example 22 was repeated, except that 9 weight percent, based on the weight of the binder precursor, of the molecular dipole G9 was substituted for the molecular dipole G2 and the exposure time was increased to 45 minutes. Second harmonic generation was observed similarly as in Example 18.

EXAMPLE 29

Poled Transmission Medium Containing 4'-Diallylamino-4-nitrostilbene (G12)

The procedure of Example 22 was repeated, except that 11 weight percent, based on the weight of the binder precursor, of the molecular dipole G12 was substituted for the molecular dipole G2 and the exposure time was increased to 150 minutes. Second harmonic generation was observed similarly as in Example 18.

EXAMPLE 30

Poled Transmission Medium Containing an Increased Concentration of (G12)

The procedure of Example 20 was repeated, except that 17 weight percent, based on the weight of the binder precursor, of the molecular dipole G12 was employed and the exposure time was increased to 600 minutes. Second harmonic generation was observed similarly as in Example 18.

EXAMPLE 31

Poled Transmission Medium Containing a Crosslinked Urethane

The procedure of Example 25 was repeated, except that a Norland 60 ™, a urethane based polyene mercaptan ester containing a photoinitiator, commercially available from Norland Products Inc. was substituted for the binder precursor and coinitiators employed in Example 25. Second harmonic generation was observed similarly as in Example 18.

The invention has been described in detail with particular reference to preferred embodiments thereof, but it will be understood that variations and modifications can be effected within the spirit and scope of the invention.

What is claimed is:

1. An optical article containing, for the transmission of electromagnetic radiation, a medium exhibiting a second order polarization susceptibility greater than $10^{-9}$ electrostatic units comprised of polar aligned noncentrosymmetric molecular dipoles having an electron donor moiety linked through a conjugated $\pi$ bonding system to an electron acceptor moiety to permit oscillation of the molecular dipole between a ground state exhibiting a first dipole moment and an excited state exhibiting a differing dipole moment, characterized in that the molecular dipoles are held in polar alignment by a crosslinked polymeric binder and form at least 1 percent of said transmission medium based on the weight of the crosslinked polymeric binder.

2. An optical article according to claim 1 further characterized in that means are provided for directing electromagnetic radiation to said transmission medium.

3. An optical article according to claim 1 further characterized in that biasing means are provided for placing an electric field across said transmission medium.

4. An optical article according to claim 3 further characterized in that said biasing means includes at least one transparent electrode in contact with said transmission medium.

5. An optical article according to claim 1 further characterized in that said transmission medium lies in contact with a linear waveguide for electromagnetic radiation.

6. An optical article according to claim 1 further characterized in that said molecular dipoles form up to 50 percent of said transmission medium based on the weight of said crosslinked polymeric binder.

7. An optical article according to claim 6 further characterized in that said molecular dipoles form from 10 to 20 percent of said transmission medium based on the weight of said crosslinked polymeric binder.

8. An optical article according to claim 1 further characterized in that said molecular dipoles satisfy the formula:

where
A is an electron acceptor moiety;
D is an electron donor moiety; and
E is a conjugated $\pi$ bonding system.

9. An optical article according to claim 8 further characterized in that A is a cyano, nitro, acyl, or sulfonyl electron acceptor moiety.

10. An optical article according to claim 8 further characterized in that D is an amino moiety.

11. An optical article according to claim 10 further characterized in that D is a secondary or tertiary amino moiety.

12. An optical article according to claim 8 further characterized in that A and E together form a sulfonimino moiety.

13. An optical article according to claim 8 further characterized in that D and E together form a pyridinium moiety.

14. An optical article according to claim 8 further characterized in that E is chosen to provide a 4,4'-stilbenoid conjugated $\pi$ bonding system.

15. An optical article according to claim 14 further characterized in that E is chosen to provide a 4,4'-stilbene conjugated $\pi$ bonding system.

16. An optical article according to claim 8 further characterized in that said molecular dipoles include those satisfying the formulae:
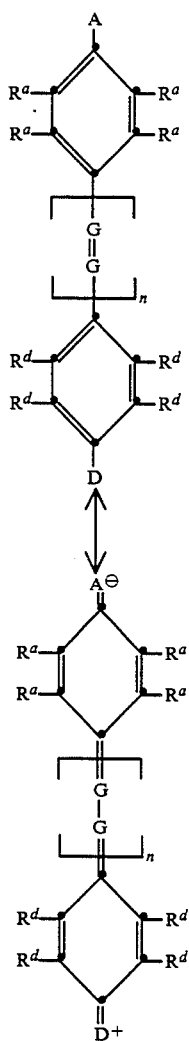
(a)
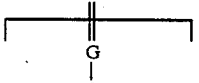
(b)
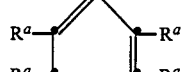
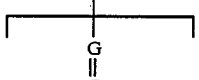
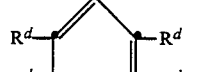
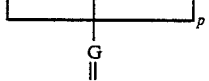

(c)

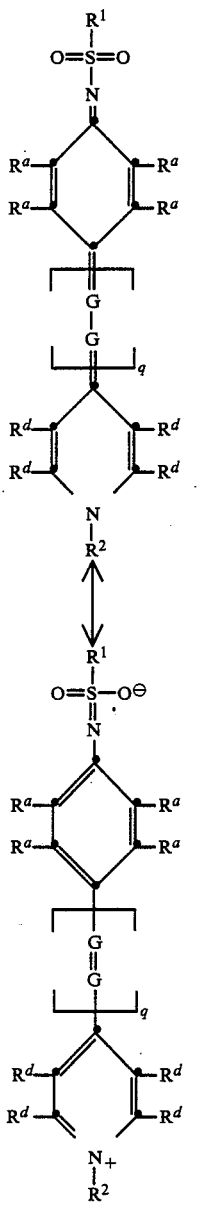

where
A is an electron acceptor moiety;
D is an electron donor moiety;
G is independently in each occurrence a methine or aza moiety, with the proviso that no more than two aza moieties are next adjacent;
n is an integer of from 1 to 3;
p is 0 or 1;
q is an integer of from 0 to 3;
$R^1$ and $R^2$ are optionally substituted hydrocarbon moieties;

$R^a$ is chosen from the group consisting of hydrogen and substituents which collectively, together with A, $-SO_2R^1$, or $=NSO_2R^1$, enhance the electron acceptance of the aromatic ring to which they are attached; and $R^d$ is chosen from the group consisting of hydrogen and substituents which collectively, together with D or $-R^2$, enhance the electron donation of the aromatic ring to which they are attached.

17. An optical article according to claim 16 further characterized in that A is a cyano or nitro electron acceptor moiety.

18. An optical article according to claim 16 further characterized in that D is a tertiary amino electron donor moiety.

19. An optical article according to claim 1 further characterized in that said binder is comprised of a photocrosslinked polymer.

20. An optical article according to claim 1 further characterized in that the optical transmission medium is comprised of a photocrosslinked negative working photoresist.

21. An optical article according to claim 1 further characterized in that said binder is comprised of a crosslinked diazo resin.

22. An optical article according to claim 1 further characterized in that said binder is photopolymer crosslinked at sites of ethylenic unsaturation.

23. An optical article according to claim 22 further characterized in that said binder is a photopolymer crosslinked at sites of $\alpha,\beta$-ethylenic unsaturation.

24. An optical article according to claim 1 further characterized in that said binder is crosslinked polymerized monomer containing repeating units of the formula:

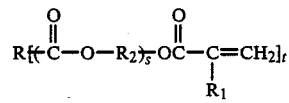

wherein
R represents a cycloaliphatic or an aromatic group;
$R_1$ represents hydrogen or alkyl of from 1 to 6 carbon atoms;
$R_2$ represents alkylene of 1 to 20 carbon atoms or $-CH_2CH_2(OCH_2CH_2)r$;
r is 1 to 20;
s is 0 or 1; and
t is 2 to 6.

25. An optical article according to claim 24 further characterized in that R represents a cyclohexyl, phenyl, or naphthyl group;
$R_1$ represents hydrogen or methyl;
$R_2$ represents alkylene of 1 to 10 carbon atoms or $-CH_2CH_2(OCH_2CH_2)r$;
r is 1 to 6;
s is 0 or 1; and
t is 2 to 4.

* * * * *